US010520397B2

(12) United States Patent
Gao et al.

(10) Patent No.: US 10,520,397 B2
(45) Date of Patent: Dec. 31, 2019

(54) METHODS AND APPARATUSES FOR DEFECT DIAGNOSIS IN A MECHANICAL SYSTEM

(75) Inventors: Robert X. Gao, Cleveland, OH (US); Jinjiang Wang, Beijing (CN); Ruqiang Yan, Nanjing (CN); Brian Charles Ellis, Spring, TX (US); Boone Elbert Smith, Pinehurst, TX (US); Jose Abelardo Sanchez Puente, Richmond, TX (US)

(73) Assignees: University of Connecticut, Farmington, CT (US); Canrig Drilling Technology Ltd., Magnolia, TX (US)

( * ) Notice: Subject to any disclaimer, the term of this patent is extended or adjusted under 35 U.S.C. 154(b) by 910 days.

(21) Appl. No.: 14/403,999

(22) PCT Filed: May 31, 2012

(86) PCT No.: PCT/US2012/040290
§ 371 (c)(1),
(2), (4) Date: Apr. 21, 2015

(87) PCT Pub. No.: WO2013/180723
PCT Pub. Date: Dec. 5, 2013

(65) Prior Publication Data
US 2015/0233792 A1 Aug. 20, 2015

(51) Int. Cl.
*G01M 13/00* (2019.01)
*G01M 99/00* (2011.01)
(52) U.S. Cl.
CPC ........ *G01M 99/005* (2013.01); *G01M 99/008* (2013.01)
(58) Field of Classification Search
CPC .................................................. G01M 99/008
(Continued)

(56) References Cited

U.S. PATENT DOCUMENTS 3,823,407 A 7/1974 Williams
4,387,774 A 6/1983 Herbert
(Continued)

FOREIGN PATENT DOCUMENTS

AU 1036870 A 7/1971
EP 2 208 981 A1 7/2010
(Continued)

OTHER PUBLICATIONS

International Preliminary Report on Patentability for International Application No. PCT/US2012/040290, Titled: "Methods Apparatuses for Defect Diagnosis in a Mechanical System," dated Dec. 2, 2014.

(Continued)

*Primary Examiner* — Manuel L Barbee
(74) *Attorney, Agent, or Firm* — Hamilton, Brook, Smith & Reynolds, P.C.

(57) ABSTRACT

Multiple methods and corresponding apparatuses for efficient and reliable defect diagnosis in components of mechanical systems, are described. According to one aspect, multi-scale enveloping-order spectrogram is used to diagnose, or detect, defects in a moving component of a mechanical system. According to another aspect, defect identification and diagnosis in a motor is performed based on spectral characteristics of motor current envelope. According to yet another aspect, a logic rule model, employing classification of features associated with single- or multi-sensor data, is employed for diagnosis of defects in components of mechanical systems.

32 Claims, 19 Drawing Sheets

(58) Field of Classification Search
USPC ................ 702/6, 35, 51, 114; 166/253.1; 340/853.3
See application file for complete search history.

(56) References Cited

U.S. PATENT DOCUMENTS

| | | | |
|---|---|---|---|
| 5,237,539 | A | 8/1993 | Selman |
| 5,375,098 | A | 12/1994 | Malone et al. |
| 6,727,725 | B2 | 4/2004 | Devaney et al. |
| 6,847,917 | B2 | 1/2005 | Bechhoefer |
| 6,954,066 | B2 | 10/2005 | Siess et al. |
| 7,328,741 | B2 | 2/2008 | Allen et al. |
| 7,602,985 | B2 | 10/2009 | Gao et al. |
| 8,672,055 | B2 | 3/2014 | Boone et al. |
| 9,605,527 | B2 | 3/2017 | Reiderman et al. |
| 2002/0124652 | A1 | 9/2002 | Schultz et al. |
| 2002/0139581 | A1 | 10/2002 | Schultz et al. |
| 2002/0144842 | A1 | 10/2002 | Schultz et al. |
| 2002/0148646 | A1 | 10/2002 | Schultz et al. |
| 2002/0186039 | A1 | 12/2002 | Devaney et al. |
| 2005/0096873 | A1 | 5/2005 | Klein |
| 2006/0111872 | A1 | 5/2006 | Papadimitriou et al. |
| 2006/0250103 | A1 | 11/2006 | Stockberger et al. |
| 2009/0065258 | A1 | 3/2009 | Hamilton |
| 2009/0222228 | A1 | 9/2009 | Gao et al. |
| 2010/0063393 | A1* | 3/2010 | Moradi .............. A61B 8/0833 600/442 |
| 2011/0187556 | A1* | 8/2011 | Roddy .................... G01V 3/00 340/853.3 |
| 2013/0175094 | A1 | 7/2013 | Ross et al. |
| 2014/0116776 | A1 | 5/2014 | Marx et al. |
| 2014/0182848 | A1* | 7/2014 | Roberson ............... E21B 33/13 166/253.1 |
| 2015/0160101 | A1 | 6/2015 | Gao et al. |
| 2015/0167392 | A1 | 6/2015 | Sugiura |

FOREIGN PATENT DOCUMENTS

| | | |
|---|---|---|
| FR | 2 911 398 A1 | 7/2008 |
| GB | 2 057 694 A | 4/1981 |
| WO | WO 2013/180723 | 12/2013 |
| WO | WO 2013/180727 | 12/2013 |

OTHER PUBLICATIONS

International Search Report and the Written Opinion for International Application No. PCT/US2012/040318, Titled: "A Method and a System for Testing Operational Integrity of a Drilling Rig," dated Mar. 15, 2013.

Notification of Transmittal of the International Search Report and the Written Opinion of the International Searching Authority, International Application No. PCT/US2012/040290, International Filing Date: May 31, 2012, Entitled: "Methods Apparatuses for Defect Diagnosis in a Mechanical System".

Zhang, L., et al., "Wavelet-Based Enveloping for Spindle Health Diagnosis," *Instrumentation and Measurement Technology Conference*, Ottawa, Canada (May 2005).

Notification of Concerning Transmittal of the International Preliminary Report and Patentability, dated Dec. 11, 2014, for International Application No. PCT/US2012/040318, International Filing Date May 31, 2012, consistiing of 7 pages.

* cited by examiner

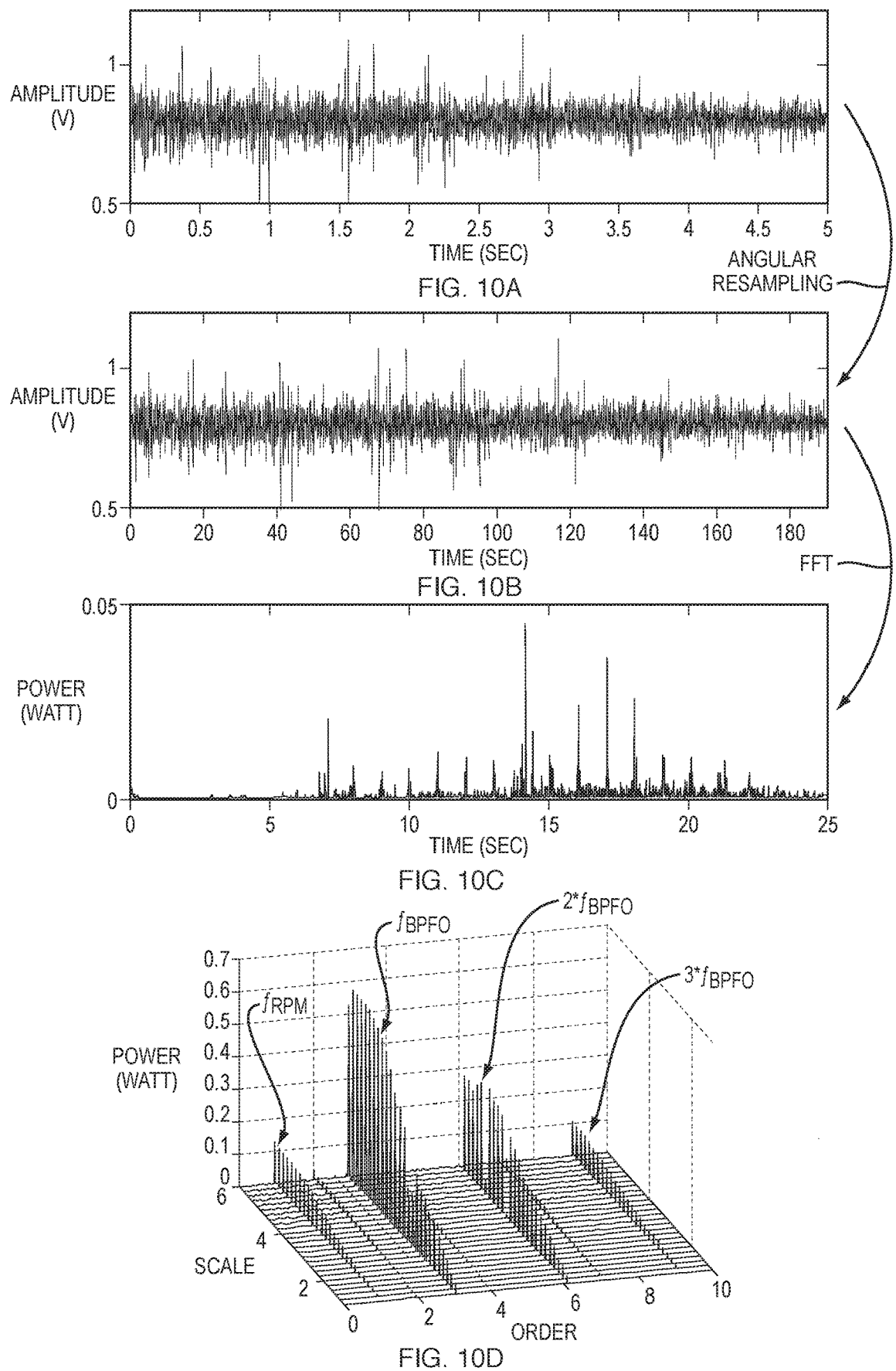

METHODS AND APPARATUSES FOR DEFECT DIAGNOSIS IN A MECHANICAL SYSTEM

RELATED APPLICATION

This application is the U.S. National Stage of International Application No. PCT/US2012/040290, filed on May 31, 2012, published in English, the entire teachings of which are incorporated herein.

BACKGROUND OF THE INVENTION

The expense of equipment or parts employed in mechanical systems, e.g., a drilling rig, as well as the cost associated with typical corresponding mechanical operations drive an increasing demand for system reliability. Efficient monitoring and early defect diagnosis of vital components of mechanical systems are relevant factors in achieving reliable and trouble-free operations, e.g., drilling operation in the case of a drilling rig.

SUMMARY OF THE INVENTION

According to one aspect, a method of detecting a defect in a mechanical system comprises calculating a plurality of features using, at least in part, multi-sensor data associated with at least one component of the mechanical system; classifying a subset of the calculated plurality of features based on classification patterns constructed from multi-sensor training data; and determining whether a defect exists in the at least one component based on the classified subset of features.

According to another aspect, a method of detecting a defect in a mechanical system comprises calculating a set of wavelet envelopes of a time sampled first representation of a moving component of the mechanical system; converting the set of wavelet envelopes from a time domain to a spatial domain based on measured samples of a time sampled second representation of motion associated with the moving component; determining one or more spectral energy concentrations of the converted wavelet envelopes associated with at least one expected defect frequency of the moving component; determining whether a defect in the moving component exists based on the calculated one or more spectral energy concentrations.

According to yet another aspect, a method of detecting a defect in a mechanical system comprises calculating an envelope of an electric current signal of a motor of the mechanical system; calculating one or more spectral energy concentrations of the envelope at one or more expected defect frequencies of the motor; and determining whether a defect in the motor exists based on the calculated one or more spectral energy concentrations.

According to even another aspect, a method of detecting a defect in a mechanical system comprises converting a set of measured samples of a time sampled first representation of motion associated with a moving component of the mechanical system from time domain to spatial domain based on measured samples of a time sampled second representation of motion associated with the moving component; calculating a set of wavelet envelopes of the converted set of measured samples of the time sampled first representation of the moving component of the mechanical system; determining one or more spectral energy concentrations of the calculated wavelet envelopes associated with at least one expected defect frequency of the moving components; and determining whether a defect in the moving component exists based on the calculated one or more energy concentrations.

A representation of motion may be a function, or corresponding measured samples, of spatial displacement, speed, acceleration, or jerk. Spatial displacement may refer to change in rotational angle, translational displacement, or any other measure of change in location. The spatial domain refers to rotational angle domain, translational spatial domain, or any spatial domain for defining location and motion of objects.

According to another aspect, an apparatus comprises means for performing any of the methods above. The means include a memory, computer code instructions stored thereon, and a processor to execute the computer code instructions. The computer code instructions when executed cause the apparatus to perform any of the methods above.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 10A through 10D illustrate difference in experimental results between an order spectrum and a wavelet-based multi-scale enveloping order spectrogram.

DETAILED DESCRIPTION OF THE INVENTION

A description of example embodiments of the invention follows.

Common techniques for drilling rig operation monitoring use measured parameters such as speed, rate of penetration, drill bit location etc. More advanced techniques used for monitoring drilling rigs and other mechanical systems include analyzing other measured parameters or signals, such as vibration, motor current, load, wear debris, etc. Herein, new monitoring approaches are disclosed.

Figure 1:
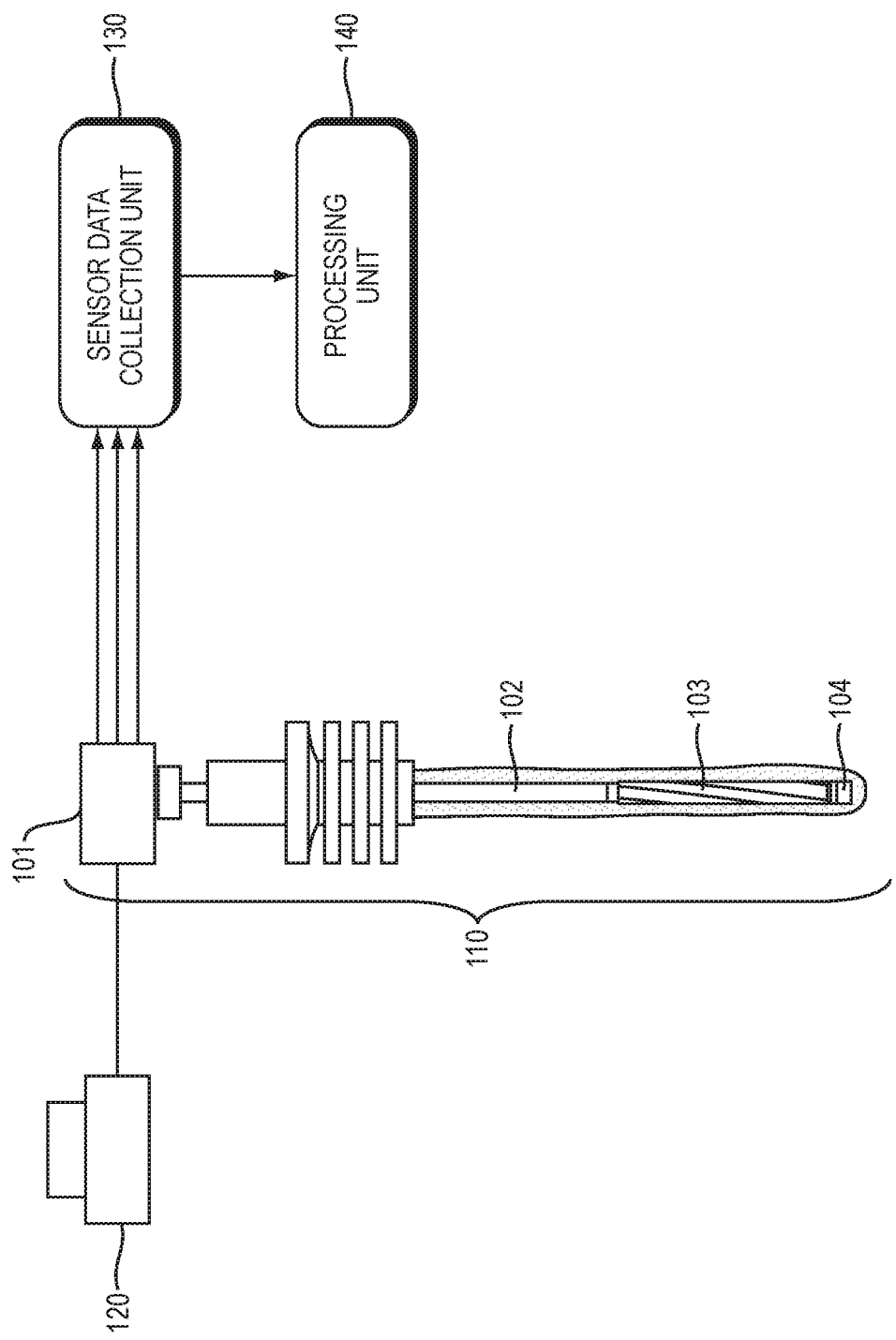
FIG. 1 describes a system overview according to an example embodiment of the present invention.

FIG. 1 describes a system overview according to an example embodiment of the present invention. A drilling rig 110 includes a top drive 101, a drill pipe 102, and a drill bit 104. The drill bit 104 is a cutting tool that is configured to dig through the earth's crust as it is caused to rotate by an induction motor (not shown) in the top drive 101. The induction motor is mechanically coupled to the drill bit 104 through gears (not shown), bearings (not shown), and a drill shaft 103 or drill string. The induction motor is usually driven by electricity from an electric generator 120. During drilling operations, faults or defects may occur in the top drive gears, bearings, or drill shaft, for example. Detecting such faults and/or defects early is useful to prevent any structural damage to other components of the top drive and to avoid unnecessary and costly delays in drilling operations.

Sensor-based, real-time, condition monitoring and health diagnosis techniques enable early fault detection to avoid sudden catastrophic damage of drilling rig machinery like Top Drives, Drawworks, Mud Pumps, Electric Motor/generators, air compressors, centrifuges, centrifuge pumps, or any other mechanical systems. A sensor data collection unit 130 is used to collect measurements of one or more parameters associated with one or more of the top drive components. One or more sensors (not shown), such as accelerometer(s), encoder(s), electric current probe(s), and/or any other sensors, may be employed to measure parameters relevant to the functioning of the drilling rig components. The sensor(s) together with the sensor data collection unit may be viewed as a sensor data acquisition system.

The sensor data collection unit 130 may include one or more electronic devices, electronic circuitry, electric wires, storage memory, a processor, wired or wireless transceivers, or any other electric devices (not shown) to acquire and store collected sensor data, or to communicate the collected sensor data to a processing unit 140. The data processing unit 140 may be a computer server, personal computer, laptop, notebook, tablet, smart phone, cloud of servers, or combination thereof. The data processing unit 140 is configured to process and analyze the collected data to determine one or more current conditions of one or more monitored components or equipments. In some embodiments, the processing and analysing of the data, as well as the determining of the current condition(s) of monitored component (s), is performed through execution of computer code instructions by at least one processor of the data processing unit 140.

Timely diagnosis of defects in any of the components of the drilling rig enables predictive and condition based maintenance and repair work to be scheduled according to actual operating conditions of the drilling rig, instead of a predetermined, preventive maintenance (PM), fixed, time interval. As such, structural faults may be prevented from progressing unnoticed until they unexpectedly cause substantial equipment damage and costly downtime of the drilling operation.

Figure 2:
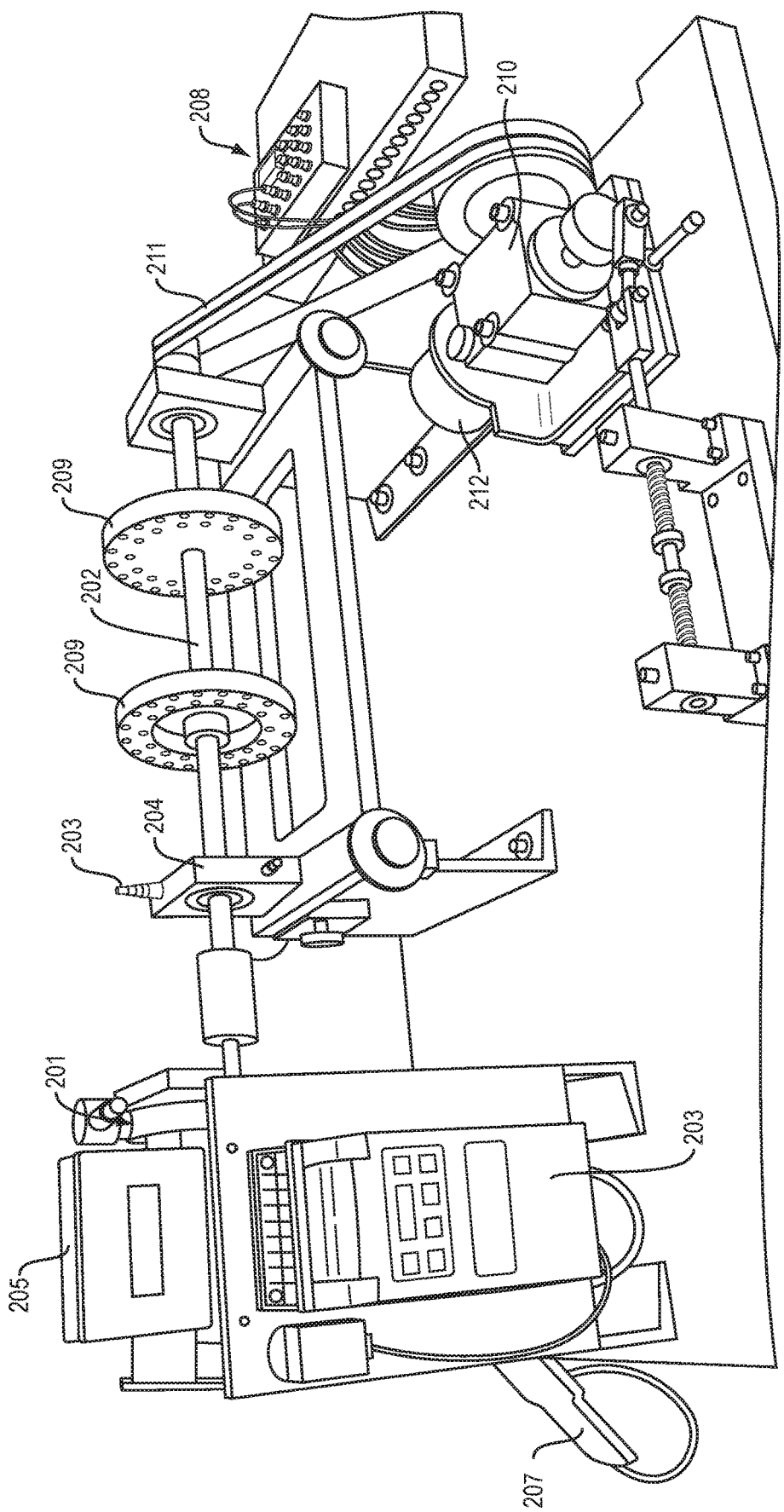
FIG. 2 shows an example experimental setup of a mechanical system and sensors for measuring data to diagnose defects at one or more components of the mechanical system.

FIG. 2 shows an example experimental setup of a mechanical system and sensors for measuring data to diagnose defects at one or more components of the mechanical system. The system is driven by an induction motor 201. A shaft 202 is coupled to the induction motor 201. The rotation speed of the shaft is controlled by a speed controller 203 and measured by a tachometer 205. The shaft is also coupled to a bearing 204. An accelerometer 206 is mounted on the housing of the bearing to measure its vibration. Static load is applied to the bearing 204 through two load discs 209 that are coupled to the shaft 202. Also, a variable load is applied by a magnetic brake system 212 through a bevel gearbox 210 and a belt drive 211. A data acquisition system 208 is employed for collection of sensor-measured data. A current probe 207 is clamped on one of the three-phase wires to the motor 201 to measure the motor current signal. The data acquisition system 208 is configured to collect data samples of the shaft rotation speed measured by the tachometer 205, data samples of the vibration, or acceleration, signal measured by the accelerometer 206, and data samples of the motor current signal measured by the current probe 207.

In the following multiple solutions for efficient and reliable diagnosis of mechanical components of mechanical systems, e.g., drilling rigs, are described. According to one aspect, multi-scale enveloping-order spectrogram is used to diagnose, or detect, defects in a moving component of a mechanical system. According to another aspect, defect identification and diagnosis in induction motors is performed based on analysis of motor current envelope. According to yet another aspect, multi-sensing and corresponding computational methods are employed for diagnosis of drilling rigs or other mechanical systems.

Multi-scale Enveloping-order Spectrogram

Rolling element bearings are present in a variety of mechanical systems including drilling rigs. Bearing failure represents a typical contributor to mechanical systems' performance deterioration or costly corresponding downtime. Measurements of vibration signals are herein employed for the health monitoring of bearings in drilling rigs and other mechanical systems. Vibration signals are directly associated with the structure dynamics of bearings. Vibration impacts induced by a localized bearing defect usually excite one or more resonance modes of the bearing structure, leading to repetitive and periodic vibration impulses. Frequencies related to such resonance modes are located, typically, in frequency regions higher than those caused by machine-borne vibrations. The excited resonance modes are usually characterized by an energy concentration within one or more relatively narrow frequency bands at one or more of the resonance frequencies.

Efficient and reliable defect diagnosis of a bearing based on spectral characteristics of corresponding vibration signal measurements, however, depends at least in part on the effectiveness and efficiency of the signal processing techniques employed to extract and analyse the defect related features from the vibration signal measurements. Some existing processing techniques in the art are constructed based on an assumption that the rotational speed of the bearing is constant. In typical real-world scenarios, the constant rotational speed assumption is not accurate enough to lead to efficient and reliable detections of defects in bearings. Computed order tracking is an example approach for gearbox and bearing diagnosis under varying speed conditions. This technique is based on synchronous re-sampling. In other words, vibration data sampled at equal time periods is converted to vibration data corresponding to equal rotational angle intervals, or increments, to eliminate effects of speed variation. An inherent requirement of computed order techniques is prior selection or determination of a proper filtering band in order to cope with rotational speed variation. However under varying operating conditions of mechanical systems and mechanical components therein, different variations in the operating conditions may cause different resonance modes to be excited. As such, prior knowledge of the filtering band may be a requirement that is difficult to meet in varying operating conditions of mechanical systems such as drilling rigs.

In computed order tracking techniques both the vibration signals measured, for example, at a bearing being monitored and the output from a speed sensor, e.g., a tachometer, at constant time intervals are recorded. Synchronous re-sampling is then performed to convert measured vibration signal samples, sampled at equal time intervals, vibration signal samples corresponding to equal rotational angle intervals or increments. During re-sampling, two distinct estimation processes take place. The first one involves determining re-sampling time instances corresponding to constant rotational angle intervals or increments. In the second estimation process, amplitudes of samples of the vibration signal at the determined re-sample time instances are estimated. The second estimation process may be viewed as an interpolation of the measured vibration signal samples beyond time instances at which measurements were made.

To determine the re-sampling times, it is assumed that the shaft is undergoing constant angular acceleration. Then the shaft angle, $\theta$, may be described by a quadratic equation of the following form:

$$\theta(t) = b_0 + b_1 t + b_2 t^2 \quad (1)$$

The unknown coefficients $b_0$, $b_1$ and $b_2$ are found by fitting three successive tachometer pulse arrival times ($t_1$, $t_2$ and $t_3$), which occurs at known shaft angle increments $\Delta\theta$. This yields the following three conditions:

$$\begin{cases} \theta(t_1) = \theta_1 \\ \theta(t_2) = \theta_1 \\ \theta(t_3) = \theta_3 \end{cases} \quad (2)$$

The arrival times $t_1$ through $t_3$ are known from the sampling of the tachometer pulse signal. Substituting these conditions into Equation (1), and arranging in a matrix format gives:

$$\begin{pmatrix} \theta_1 \\ \theta_2 \\ \theta_3 \end{pmatrix} = \begin{pmatrix} 1 & t_1 & t_1^2 \\ 1 & t_2 & t_2^2 \\ 1 & t_3 & t_3^2 \end{pmatrix} \begin{pmatrix} b_0 \\ b_1 \\ b_2 \end{pmatrix} \quad (3)$$

This set of equations is then solved for the unknown $\{b_i\}$ components. Once these values are obtained, Equation (1) may be solved for t, yielding $$t = \frac{1}{2b_2}\left[\sqrt{4b_2(\theta - b_0) + b_1^2} - b_1\right] \quad (4)$$

In Equation (4), any value of $\theta$ between $\theta_1$ and $\theta_3$ will result in a corresponding time, t. This forms the basis of the re-sampling algorithm. Once the re-sampling times for constant angular increments are calculated, the corresponding data points at the respective re-sampling time instances may be determined by an interpolation between the originally sampled data. A person skilled in the art should appreciate that the calculation of re-sampling time instances may be repeated over short time intervals. The angular acceleration may be assumed to be constant over each of the short time intervals but may vary from one short time interval to another. Such approach would still approximate non constant angular acceleration. A person skilled in the art should appreciate that acceleration, as described herein, refers to both positive acceleration and negative acceleration, i.e., deceleration.

In order to overcome the requirement of prior knowledge of a proper filtering frequency band, the wavelet transform is employed. The wavelet transform decomposes a signal onto a time-scale plane, with each scale corresponding to a specific frequency band. Through scaling and shifting operations on the base wavelet $\psi(t)$, a family of wavelets is obtained:

$$\psi_{\tau,s}(t) = |s|^{-1/2}\psi\left(\frac{t-\tau}{s}\right) \quad (5)$$

In Equation (5), the symbol s represents the scaling parameter, which dilates or contracts the base wavelet, and $\tau$ is the shifting parameter that translates the wavelets along the time axis. Accordingly, the wavelet transform of a signal x(t) with finite energy may be performed through a convolution operation of x(t) with the complex conjugate of a family of wavelets:

$$wt(s, \tau) = |s|^{-1/2} \int_{-\infty}^{\infty} x(t)\overline{\psi}\left(\frac{t-\tau}{s}\right) dt \quad (6)$$

In Equation (6), $\overline{\psi}(\cdot)$ represents the complex conjugate of the scaled and shifted based wavelet $\psi(\cdot)$. Computation of the Equation (6) may be realized by a pair of Fourier transform and inverse Fourier transform. The frequency domain equivalent of Equation (6) may be expressed as:

$$WT(s, f) = \mathcal{F}\{wt(s, \tau)\} = \frac{|s|^{-1/2}}{2\pi}\int_{-\infty}^{\infty}\left(\int_{-\infty}^{\infty} x(t)\overline{\psi}\left(\frac{t-\tau}{s}\right) dt\right) e^{-j2\pi f\tau} d\tau \quad (7)$$

Based on the scaling property of the Fourier Transform and convolution theorem, Equation (7) may be further expressed as:

$$WT(s,f) = |s|^{1/2} X(f)\overline{\Psi}(sf) \quad (8)$$

where X(f) denotes the Fourier Transform of x(t) and $\overline{\psi}(\cdot)$ denotes the Fourier Transform of $\overline{\psi}(\cdot)$. By taking the inverse Fourier Transform, Equation (8) is converted back into time domain as:

$$wt(s,t) = \mathscr{F}^{-1}\{WT(s,f)\} = |s|^{1/2}\mathscr{F}^{-1}\{X(f)\overline{\Psi}(sf)\} \quad (9)$$

where the symbol $\mathscr{F}^{-1}[\cdot]$ denotes the operator of the inverse Fourier Transform. Equation (9) indicates that the wavelet transform of a signal x(t) at scale s may be viewed as the signal passing through a band-pass filter, which is a version of the filter represented by the base wavelet function with corresponding bandwidth contracted by a frequency factor of s and corresponding amplitude amplified by a factor of $|s|^{1/2}$. As a result, the wavelet transform may effectively serve as a band-pass filter for machine defect diagnosis.

An example base wavelet used herein is the complex-valued wavelet which has the property of being analytic in nature. It is expressed as:

$$\psi(t) = \psi_R(t) + j\psi_I(t) = \psi_R(t) + j\mathscr{H}\psi_R(t)] \quad (10)$$

where $\psi_R(t)$ and $\psi_I(t)$ represent the real value and the imaginary part of the complex-valued wavelet, respectively, and $\psi_I(t)$ is the Hilbert transform of $\psi_R(t)$. The corresponding wavelet transform $wt_c(s, \tau)$ of a signal x(t) using complex-valued base wavelet is expressed as:

$$wt_c(s,\tau) = wt_R(s,\tau) + jwt_I(s,\tau) = wt_R(s,\tau) + j\mathscr{H}[wt_R(s,\tau)] \quad (11)$$

where $wt_R(s, \tau)$ and $wt_I(s, \tau)$ are the real and imaginary part of the transformation results respectively, and defined as:

$$wt_R(s,\tau) = |s|^{-1/2}\int_{-\infty}^{\infty} x(t)\overline{\psi}_R\left(\frac{t-\tau}{s}\right)dt \quad (12)$$

$$wt_I(s,\tau) = \mathscr{H}[wt_R(s,\tau)] = |s|^{-1/2}\int_{-\infty}^{\infty} x(t)\mathscr{H}\left[\overline{\psi}_R\left(\frac{t-\tau}{s}\right)\right]dt$$

Equations (11) and (12) indicate the results $wt_c(s, \tau)$ obtained from the complex-valued wavelet transformation of a signal x(t), is also analytic in nature. The signal's envelope $e_{wt}(s, \tau)$ at scale s may be calculated from the modulus of the wavelet coefficients as:

$$e_{wt}(s,\tau) = \|wt_c(s,\tau)\| = \sqrt{wt_R(s,\tau)^2 + \mathscr{H}[wt_R(s,\tau)]^2} \quad (13)$$

It is seen from Equations (9) and (13) that complex-valued wavelet transformation possesses the ability of combining band-pass filtering, which is implemented though the scale parameter s, and enveloping, calculated through use of the modulus of the wavelet coefficients, into a single-step operation.

According to one aspect, a wavelet-based multi-scale enveloping order spectrogram approach includes employing the complex-valued wavelet transform, computed order tracking, and spectral analysis. In the wavelet-based multi-scale enveloping order spectrogram approach, vibration signals induced by a structural defect in the mechanical system under varying speed conditions are decomposed based on spectral frequencies.

Figure 3:
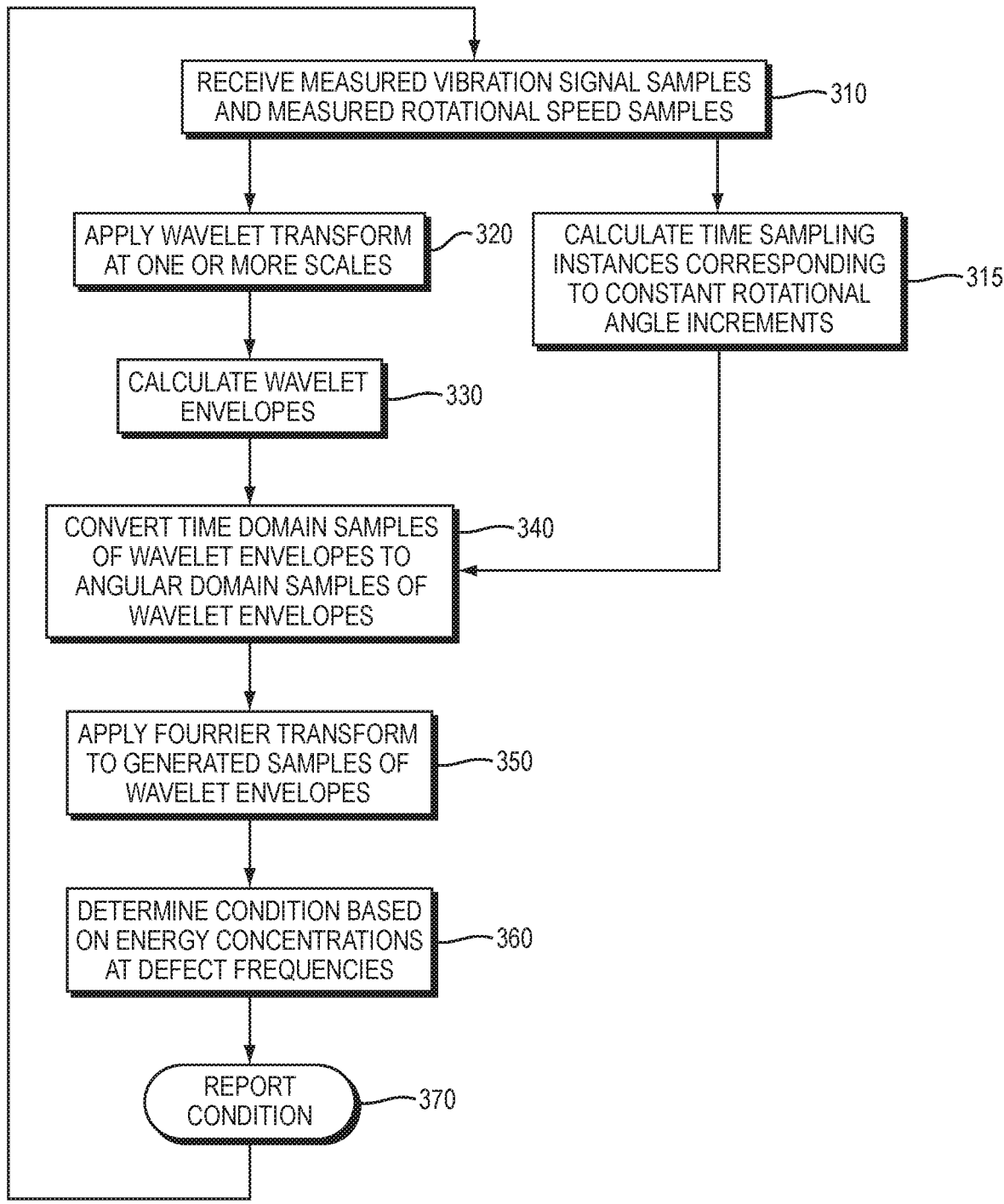
FIG. 3 is a flow chart diagram illustrating an example wavelet-based multi-scale enveloping order spectrogram process.

FIG. 3 is a flow chart diagram illustrating an example wavelet-based multi-scale enveloping order spectrogram process. In the wavelet-based multi-scale enveloping order spectrogram, time, scale, and order domain information contained in the signal is used in a synergistic fashion. According to one aspect, two types of measured signals are, processed (1) the vibration signal and (2) rotational speed signal. The two signals are measured simultaneously by a data acquisition system including sensors and signal conditioning electronics. At block 310 measured vibration signal samples and measured rotational speed samples are received or acquired by a processing unit. At block 320, wavelet transform, e.g., complex-valued wavelet transform, is applied to the measured vibration signal samples and the measured vibration signal, e.g., measured on a defective rolling bearing, is decomposed into one or more wavelet scales. At block 330, the envelope signal in each scale is calculated, for example, based on the modulus of the wavelet coefficients. At block 315, measured rotational speed samples and corresponding time sampling instances are used to calculate re-sampling time instances corresponding to constant rotational angle intervals or increments. Re-sampling time instances may be calculated, for example, as described with respect to equations (1)-(4). At block 340, synchronous re-sampling is applied so that each of the wavelet envelope signals in converted to a corresponding wavelet envelope signal evaluated at the calculated re-sampling time instances. As such, the converted wavelet envelope signals are evaluated, or have samples, corresponding to constant increments of rotational angle.

The wavelet envelope signal in the angle domain may be expressed as:

$$e_{wt}(s,\theta) = \text{Syn\_Sample}(e_{wt}(s,\tau)) \quad (14)$$

The operator Syn_Sample(*) means the synchronous re-sampling operation by interpolating the envelope signals at calculated re-sampling time instances corresponding constant rotational angle increments. At block 350, Fourier transform is performed on the envelope signals in the order domain at each scale, resulting in an "envelop order spectrum" of the original signal at the various scales. Such an envelope order spectrum is expressed as:

$$E_{wt}(s,f_d) = \mathscr{F}[\|e_{wt}(s,\theta)\|] = \frac{1}{2\pi}\int_{-\infty}^{\infty}\|e_{wt}(s,\theta)\|e^{-j2\pi f_d\theta}d\theta \quad (15)$$

Where $f_d$ is the order. At block 360, the condition of the monitored bearing is determined based on energy concentrations, in the envelop order spectrum, at expected defect frequencies. The energy, or power, of the converted envelop signal is calculated based on the square of the magnitude of $E_{wt}(s,f_d)$.

Once the energy or power values, at different expected defect frequencies for one or more wavelet scales are computed, the condition of the bearing may be determined based on a comparison of the calculated energy or power values to one or more thresholds according to one aspect. According to another aspect, the calculated energy or power values across a plurality of wavelet scales, for a particular expected defect frequency, may be averaged or summed up and then compared to a single threshold. According yet to another aspect, a decision rule may be used to determine the condition of a bearing based on how close the calculated spectral energy or power values, or corresponding averages or sums across multiple wavelet scales, to pre-recorded respective energy or power values associated with different conditions of the bearing. The spectral energy or power at one or more expected defect frequencies may also be classified according to classification patterns constructed using corresponding training data. The condition of the bearing is then determined based on the resulting classification. Other features of the vibration signal may also be used, with the calculated spectral energy or power, if feature classification is applied to determine the condition of the bearing. The condition of the bearing is then reported at block 370, and the wavelet-based multi-scale enveloping order spectrogram process is then repeated again. Condition reporting at 370, may include initiating an alarm signal, displaying a message on a screen or display device, playing an audio message, communicating information related to the condition to another device or system, or the like.

Figure 4:
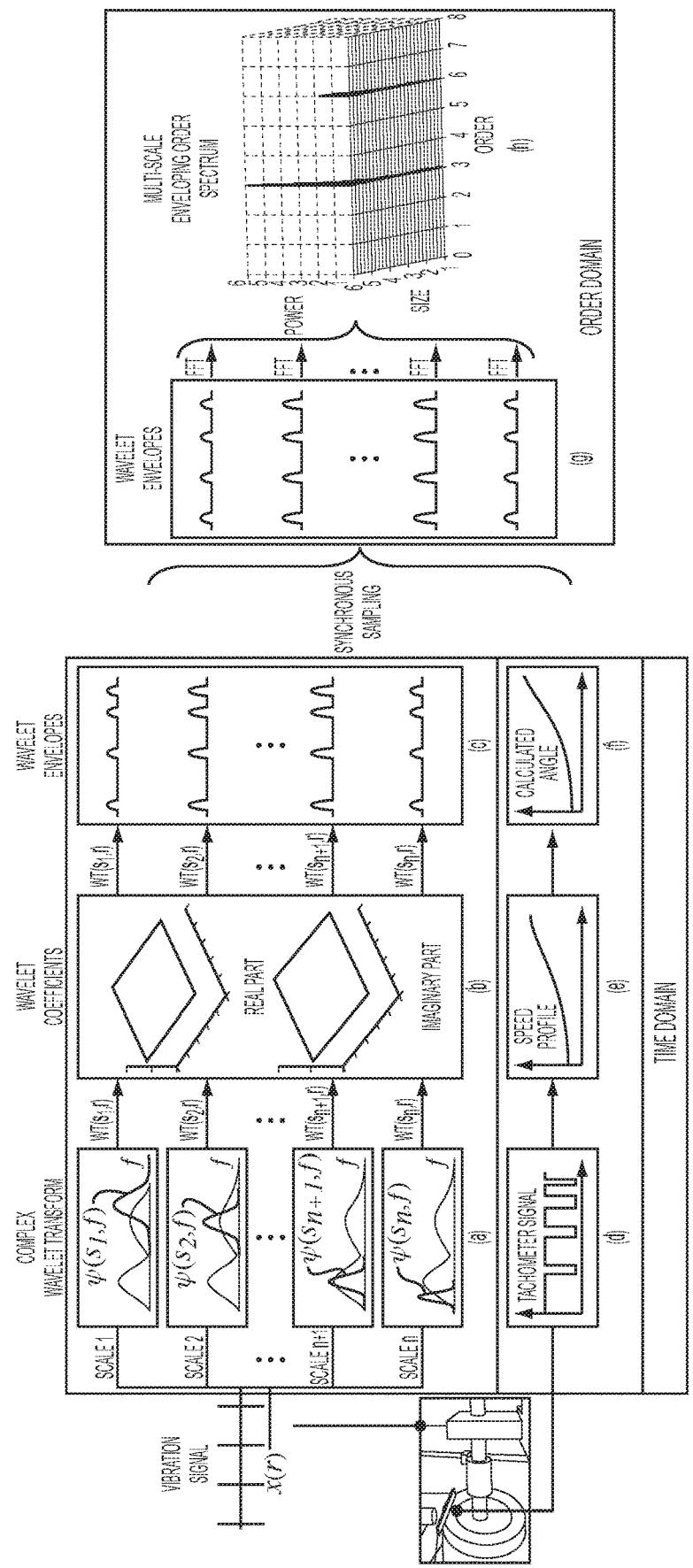
FIG. 4 illustrates output signals associated with different phases of the wavelet-based multi-scale enveloping order spectrogram process in FIG. 3.

FIG. 4 illustrates output signals associated with different phases of the wavelet-based multi-scale enveloping order spectrogram process in FIG. 3. The column of figures (a) illustrates the complex-valued wavelet transform. In column (b), the real and imaginary parts of computed wavelet coefficient are shown. Column (c) shows example plots of different wavelet envelopes corresponding to distinct wavelet scales. Column (g) shows corresponding plots of wavelet envelopes converted to correspond to equal rotational angle increments. Based on the description in FIG. 4, the $E_{wt}(s, f_d)$ operation is a two dimensional matrix, with each of its rows corresponding to the envelop order spectrum of the vibration signal at specific scale s. Each of the columns of the two dimensional matrix corresponds to a specific frequency component of the envelop order spectrum across all its scales. The energy of the signal is calculated from the square of the magnitude of $E_{wt}(s, f_d)$. The output shown in sub-figure (h) is a scale-order-energy map which indicates the intensity and location of the defect-related frequency components.

The sub-figures (d), (e), and (f), in FIG. 4, illustrate the calculation of the re-sampling time instances corresponding to constant rotational angle increments. Using a first set of time instances used in measuring samples of measured data, and the measured samples of the speed, a second set of time instances corresponding to equal increments of spatial displacement is calculated, for example, as described in equations (1) through (4). The second set of time instances is used to calculate another set of wavelet envelopes with samples corresponding to the second set of time instances.

To quantitatively evaluate the performance of the developed multi-scale enveloping order spectrogram, a synthetic signal for simulating vibration signals measured on a rolling bearing was first constructed. A power train, which is modulated by two signal harmonic frequencies with an exponential decay, is used to simulate the vibration signal of a defective bearing:

$$x(k)=(e^{-\alpha t_1}+e^{-\alpha t_2})(\sin 2\pi f_1 kT+1.2 \sin 2\pi f_2 kT) \quad (16)$$

with the time constants determined by:

$$t_1=\text{mod}(kT, 1/f_{BPFO}) t_2=\text{mod}(kT, 1/f_{BPFI}) \quad (17)$$

Figure 5A:
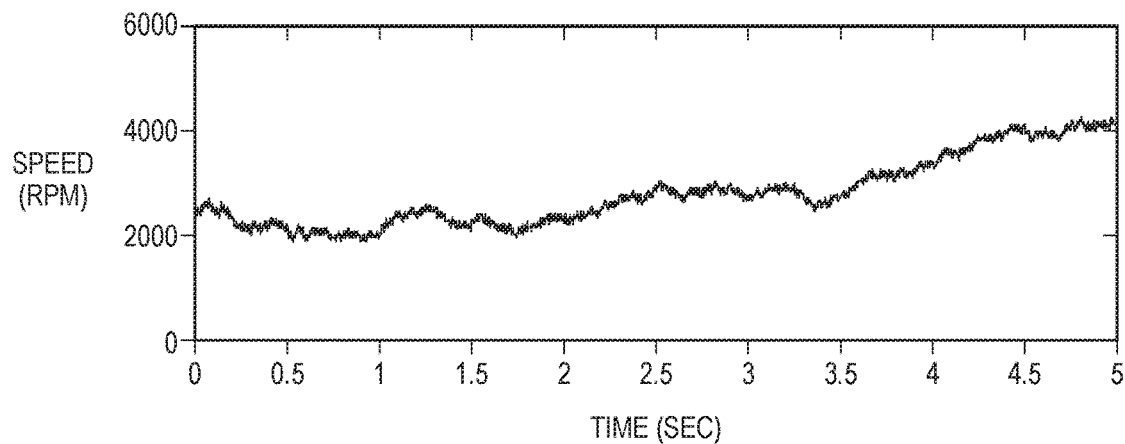
FIGS. 5A through 5C show simulation results of the wavelet-based multi-scale enveloping order spectrogram process.
Figure 5B:
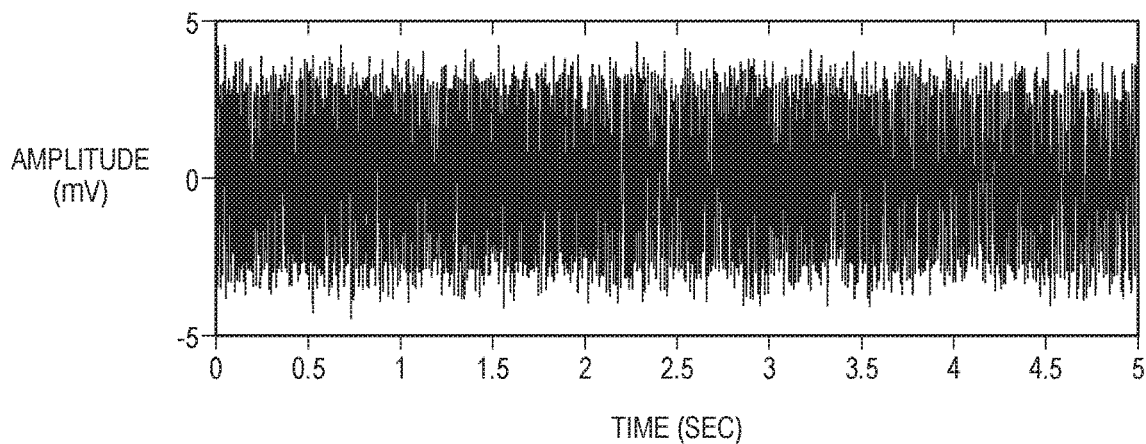
Figure 5C:
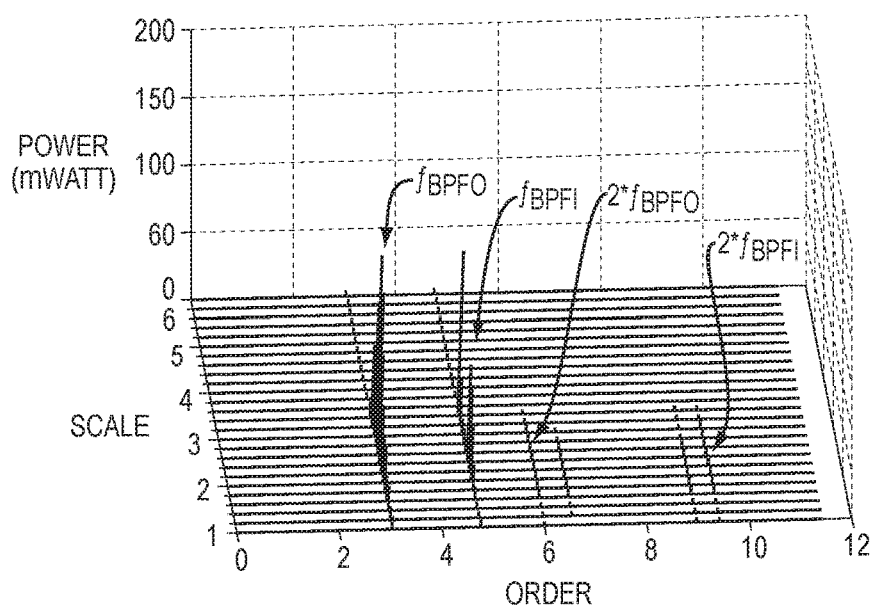

In Equations. (16)-(17) $\alpha=800$, $f_{BPFO}=300$ Hz, $f_{BPFI}=470$ Hz, $f_1=3,000$ Hz, $f_2=8,000$ Hz, are the exponential frequency, two modulation frequencies, and two carrier frequencies, respectively. The sampling frequency is set as f=20 kHz. The signal is constructed to simulate variable acceleration and deceleration within a rotational speed range of 2,000 to 4,200 rpm, as shown in FIGS. 5A and 5B. The next step is to apply the multi-scale enveloping order spectrogram method to decompose the vibration signal. Complex Morlet wavelet was selected as the base wavelet, and the scales used were 1-6, with an increment of 0.2. FIG. 5C shows the defect frequency components $f_{BPFO}$ and $f_{BPFI}$ identified at orders 3 and 4.7, respectively. The unit of order is number of times per revolution. The harmonic frequency components of $f_{BPFO}$ and $f_{BPFI}$ are evident at orders 6 and 9.4 in the spectrum.

Using the experimental setup of FIG. 2 to experimentally evaluate the multi-scale enveloping-order spectrogram, vibration signals measured on two types of bearings under different working conditions are analyzed, and the results are discussed as follows. The induction motor 201, in the example of FIG. 2, has a speed range of 0~6,000 revolutions per minute (rpm).

Figure 6A:
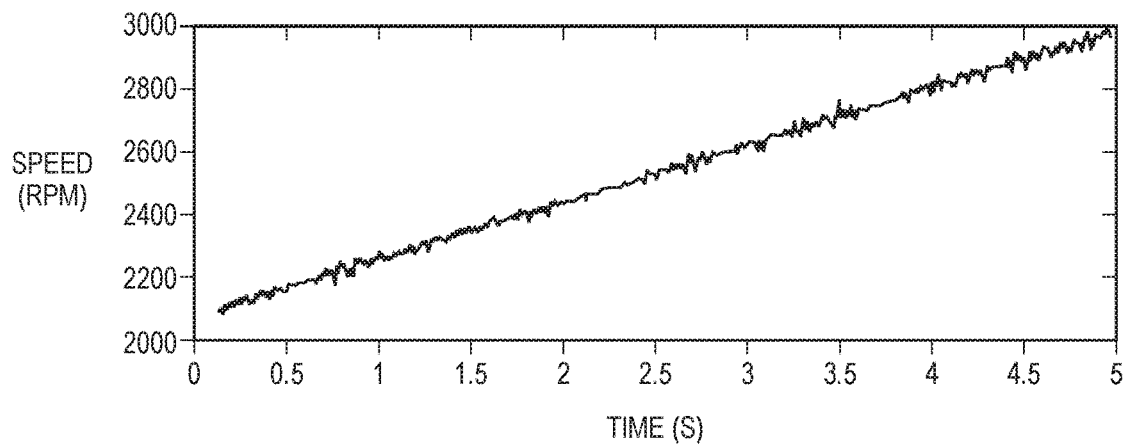
FIGS. 6A through 6C show experimental results of the wavelet-based multi-scale enveloping order spectrogram process for a bearing with an inner raceway defect.
Figure 6B:
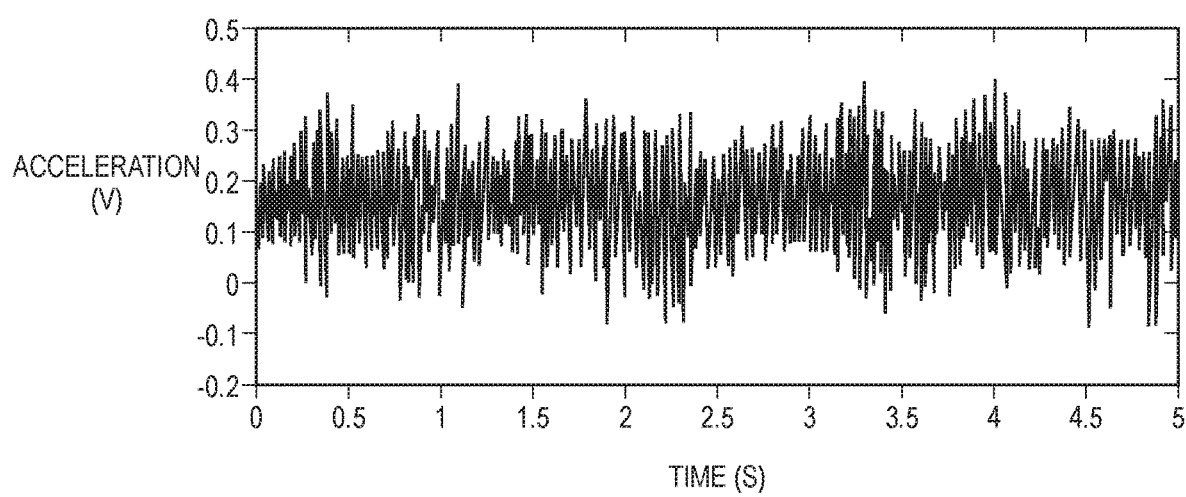

A seeded defect in the form of 0.1 mm diameter hole was induced in the inner raceway of the bearing. From the geometrical parameters of the bearings and the rotational speed, a defect-related repetitive frequency ($f_{BPFI}=5.408$ $f_{rpm}$,) associated with the inner raceway is analytically determined. The bearing was tested when the system was running-up. FIG. 6B shows the bearing vibration signal acquired under the sampling frequency 20 kHz. The corresponding rotational speed is shown in FIG. 6A. The rotational speed increases from 2,100 to 3,000 rpm.

Figure 6C:
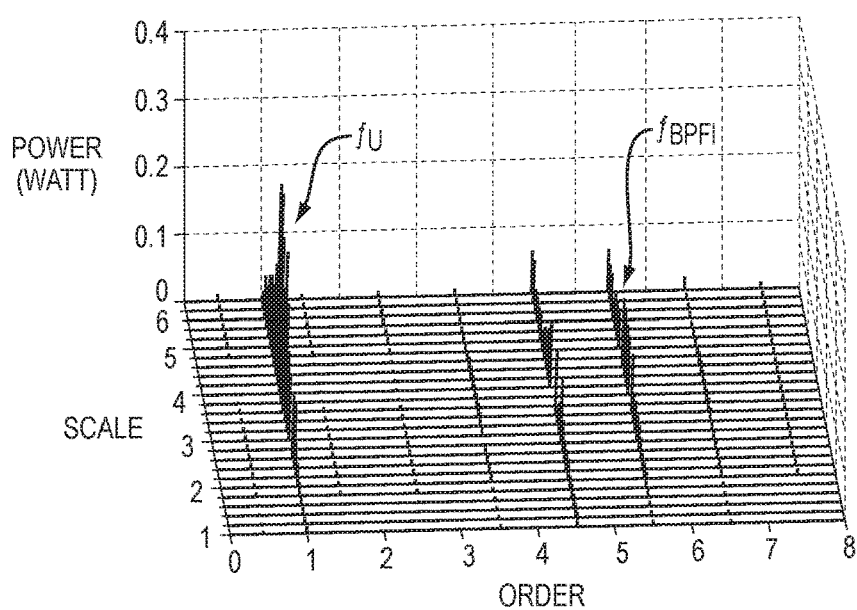

The multi-scale enveloping order spectrogram algorithm was then applied to decomposing the measured bearing vibration signal. The complex Morlet wavelet was selected as the base wavelet, and the scales used were 1-6, with an increment of 0.2, as was used for analysing the simulation results. These scales cover the frequency range of 2-10 kHz. As shown in FIG. 6C, a frequency peak is seen at the order of 5.4, indicating the existence of bearing inner raceway defect that has the value of $f_{BPFI}=5.408$ $f_{rpm}$. This illustrates the effectiveness of the multi-scale enveloping order spectrogram in diagnosing inner raceway defect under the varying shaft speed conditions as opposed to fixed rpm, as generally reported in the literature.

Figure 7A:
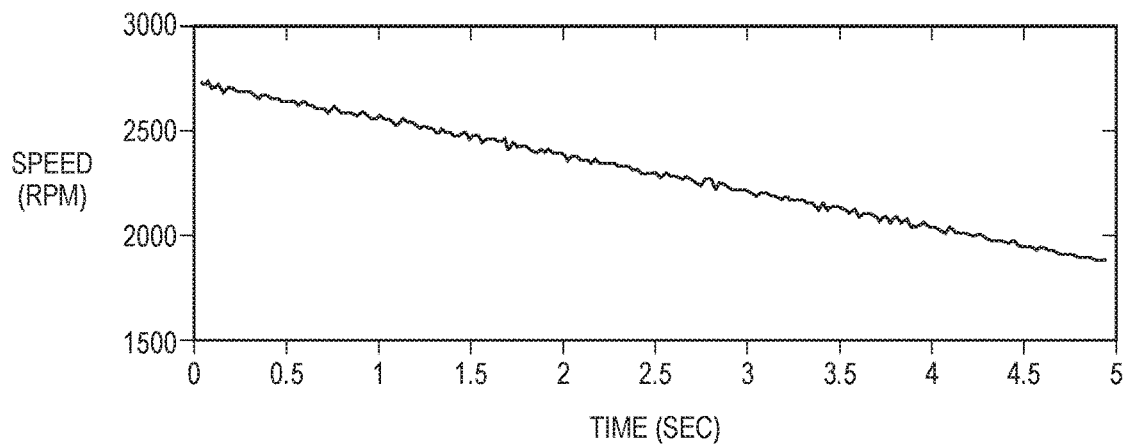
FIGS. 7A through 7C show experimental results of the wavelet-based multi-scale enveloping order spectrogram process for a bearing with an outer raceway defect.
Figure 7B:
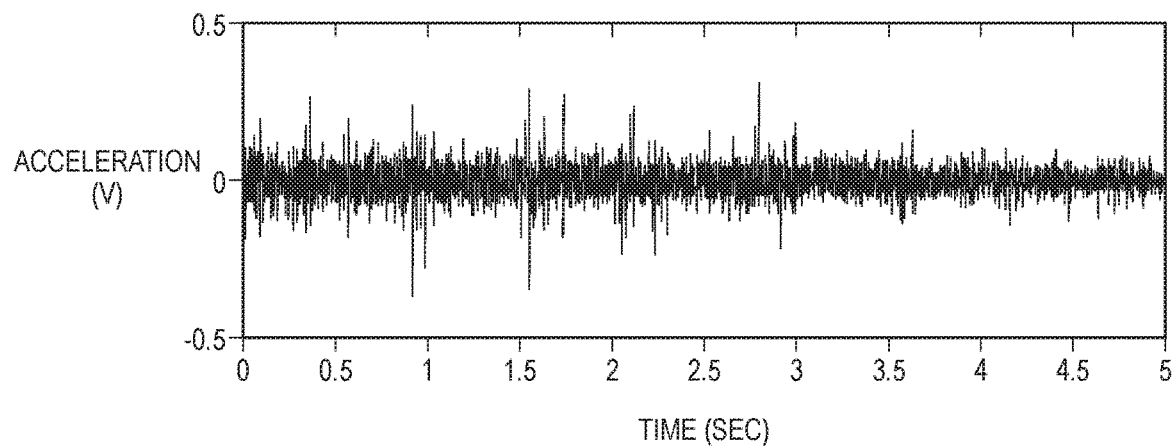

Diagnosis of outer raceway defect of ball bearing was conducted using the same bearing model and the experimental setup of FIG. 2. The defect-related characteristic frequency was calculated to be $f_{BPFO}=3.052$ $f_{rpm}$,. FIG. 7B shows the bearing vibration signal acquired under a 20 kHz sampling frequency. The corresponding rotational speed is shown in FIG. 7A. The rotational speed decelerates from 2,750 to 1,860 rpm. The vibration signal represents the acceleration signal of the bearing.

Figure 7C:
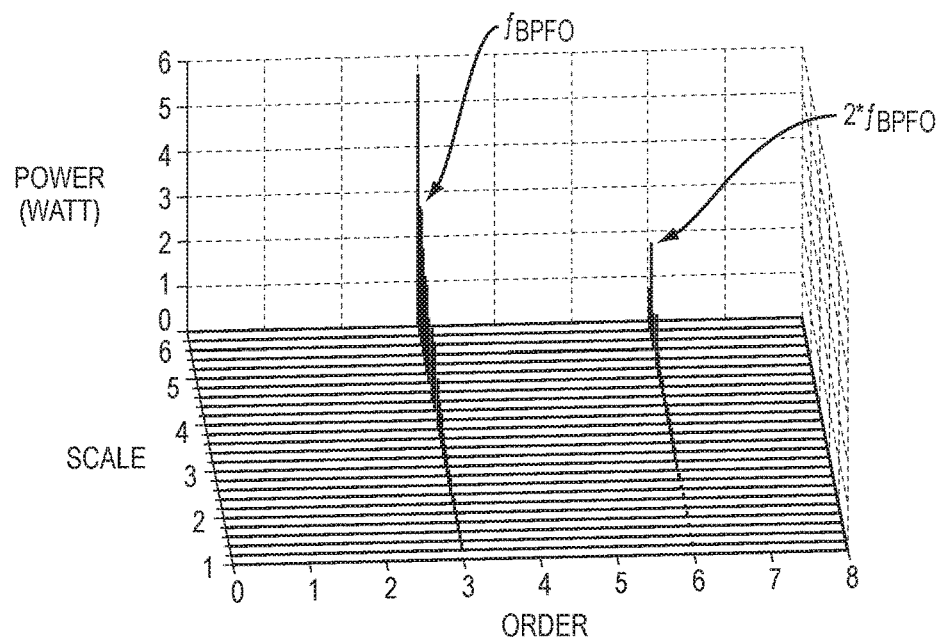

The multi-scale enveloping order spectrogram algorithm was then applied to decomposing the signal, with the decomposition scale being 1-6 at an increment of 0.2. The multi-scale enveloping-order spectrogram for the bearing vibration signal is shown in FIG. 7C.

Two peaks are shown at the orders of 3.05 and 6.1, respectively, indicating the frequency component $f_{BPFO}$ and its harmonic $2*f_{BPFO}$. These components are the characteristic frequencies of a bearing with an outer raceway defect. Thus the result demonstrates that the developed multi-scale enveloping order spectrogram is effective in identifying the existence of a localized structural defect as well as its location on the rolling bearing tested, under varying speed conditions.

Figure 8A:
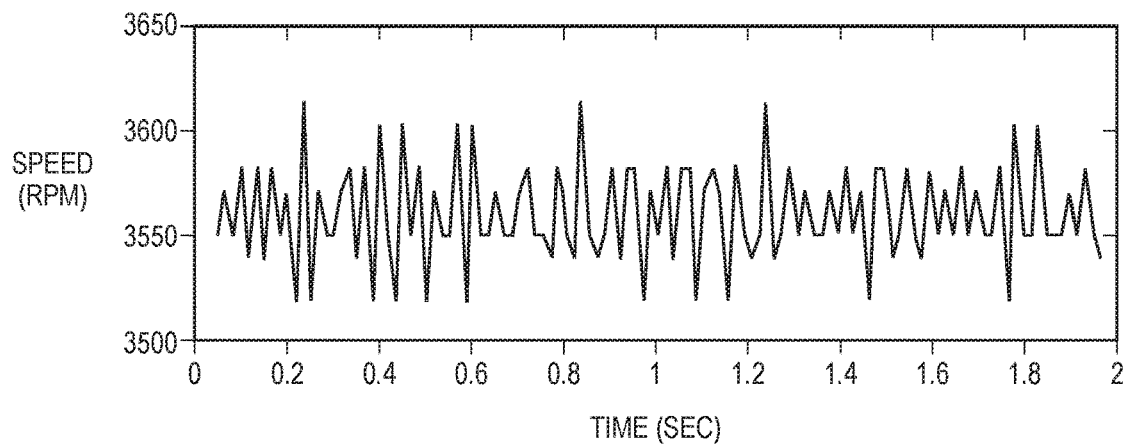
FIGS. 8A through 8C show experimental results of the wavelet-based multi-scale enveloping order spectrogram process for a bearing with multiple defects.
Figure 8B:
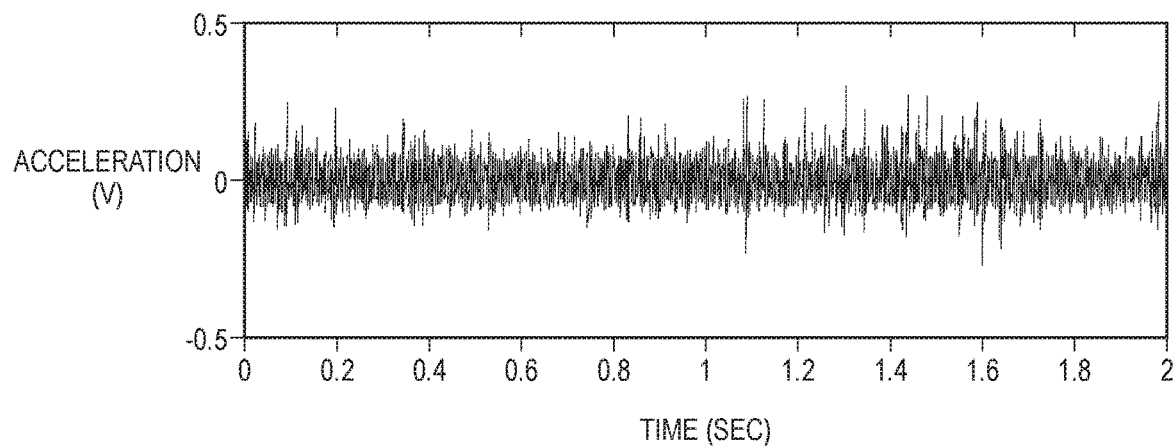

To further evaluate the effectiveness and robustness of the algorithm, a ball bearing of model MB ER-10K that is same kind of bearing with the one in outer race defect bearing and contains two localized defects on its inner and outer raceways is tested using the setup in FIG. 2. The defect-related characteristic frequencies are calculated to be $f_{BPFO}=3.052$ $f_{rpm}$ and $f_{BPFI}=4.948$ $f_{rpm}$, respectively. FIG. 8B shows the acquired vibration signal at sampling frequency=20 kHz. The corresponding rotational speed is shown in FIG. 8A. The rotational speed varies randomly in the range of 3,520-3,620 rpm.

Figure 8C:
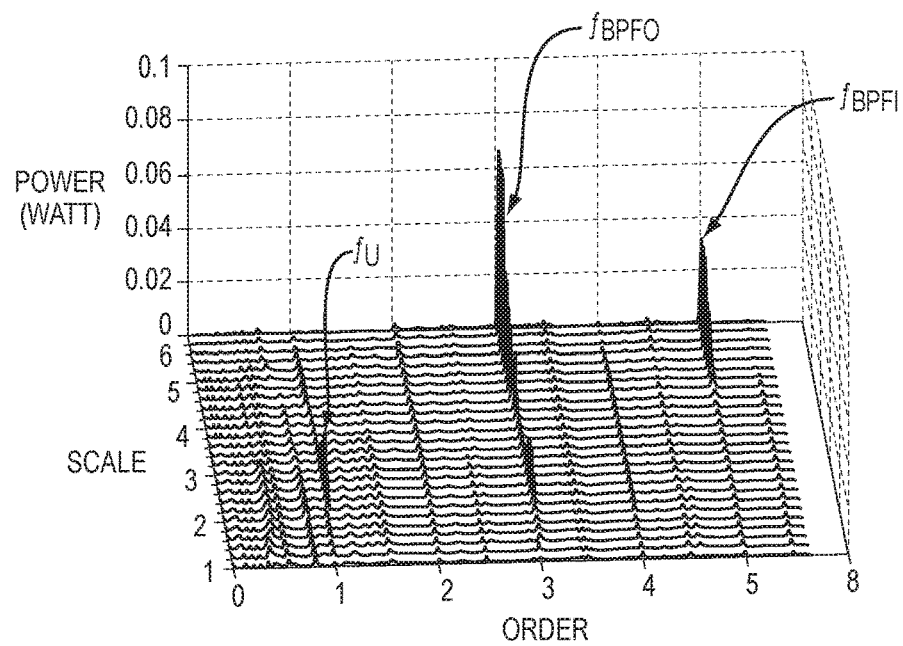

Analysis of the bearing vibration signal was performed following the same procedure described above, and the result is shown in FIG. 8C. Two major peaks at orders 3.05 and 4.95 are shown, corresponding to $f_{BPFO}$ and $f_{BPFI}$, respectively. This demonstrates that the multi-scale enveloping order spectrogram was able to identify the existence of multiple structural defects and pinpoint their respective locations, under variable speed operating conditions.

To further illustrate the merit of multi-scale envelope order spectrogram for bearing diagnosis under varying operating conditions, a comparison between the multi-scale enveloping order spectra with processing techniques including wavelet transform and order tracking, is presented below.

Wavelet transform (WT) and computed order tracking (COT) technique have been investigated for different applications. Specifically, wavelet has been used to extract transient features in bearing diagnosis under constant or near-constant operating speeds. Order tracking has been used to eliminate speed dependency when extracting angular signals for combustion engine and gear diagnosis. There has been increasing research interest in transient feature extraction under varying speed conditions. However, these two techniques cannot perform transient feature extraction in bearing diagnosis under varying operating conditions separately.

Figure 9A:
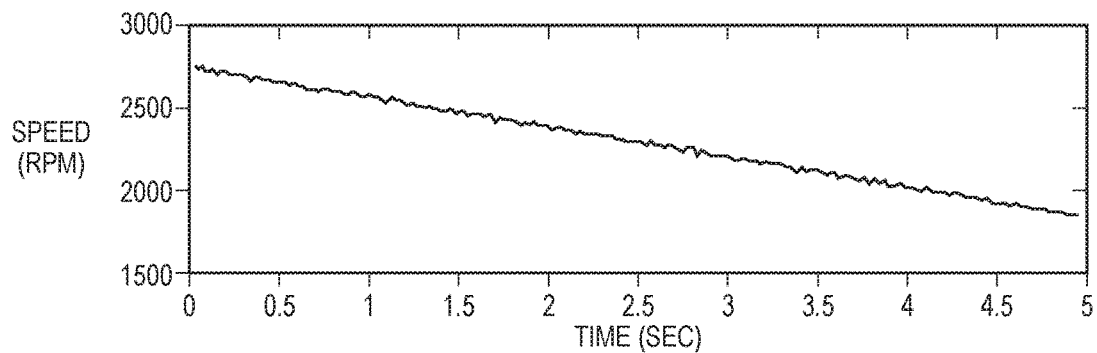
FIGS. 9A through 9D illustrate vibration signal behavior for a bearing with an outer raceway defect.
Figure 9B:
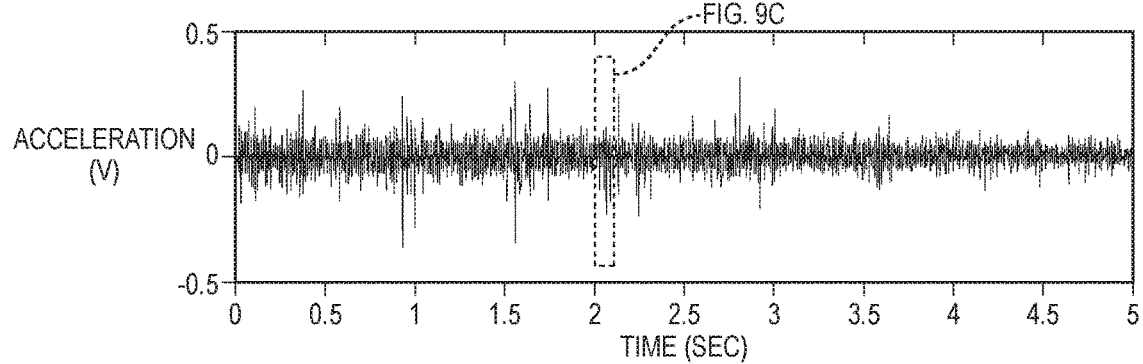
Figure 9C:
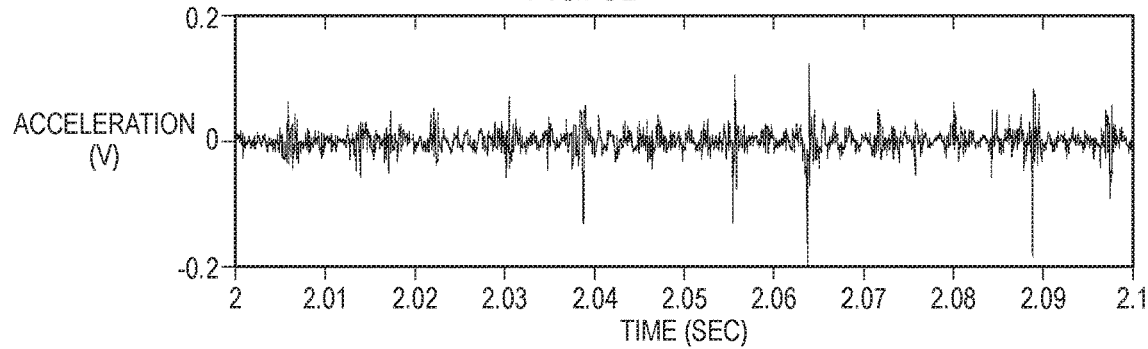
Figure 9D:
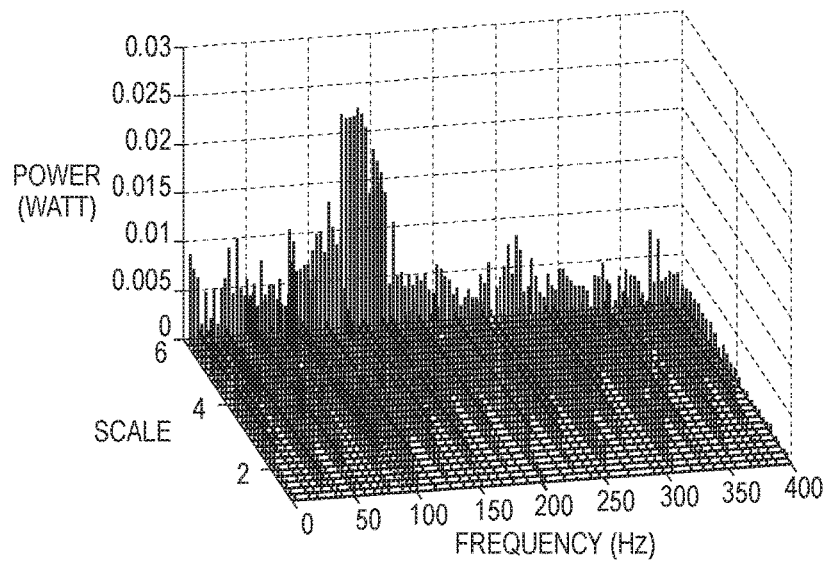

As an example, a seeded defect in the form of 0.1 mm diameter hole was induced in the outer raceway of an example bearing. From the geometrical parameters of the bearings and the rotational speed, a defect-related characteristic frequency, $f_{BPFO}=3.05^- f_{RPM}$, associated with the outer raceway is analytically determined. The frequency $f_{RPM}$ is the frequency of the revolutions per minute in the rotational speed. FIG. 9A shows the rotational speed decreasing from 2,750 to 1,860 rpm. The corresponding bearing vibration signal acquired according to a sampling frequency equal to 20 kHz is shown in FIG. 9B. FIG. 9C shows a small portion of the vibration signal in FIG. 9B. Analysis using multi-scale enveloping spectrogram, in FIG. 9D, shows that outer race defect-related frequency and its harmonics are spread across the spectrum, making it difficult to identify defect presence.

Analysis of the bearing vibration signal using order tracking is shown in FIGS. 10A through 10C. FIG. 10A shows the acquired vibration signal. Angular re-sampling is performed first on the vibration signal data to remove the effect of time variation in the speed of the bearing or shaft on the sampled vibration signal data. FIG. 10B shows the vibration signal after re-sampling according to constant increments in rotational angle. The spectrum of the re-sampled vibration signal, calculated using a Fourier transform of the re-sampled vibration signal, is shown in FIG. 10C. From the order spectrum analysis, the effect of modulation of high resonant frequencies related to the rotational speed is clear in the power spectrum in FIG. 10C. However, no bearing defect-related frequencies are clearly identifiable. Using the multi-scale enveloping order spectra method as described above, bearing defect-related frequency and its harmonics are clearly identified, as illustrated in FIG. 10D by the frequency component $f_{BPFO}$ and its harmonics. According to an alternative example defect detection/diagnosis process computed order tracking may be performed first on vibration signals, and wavelet transform is subsequently applied to the re-sampled data for defect diagnosis. In other words, measured samples of the time sampled vibration signal are re-sampled in a way to obtain new samples corresponding to equal increments in spatial displacement, e.g., rotational angle. The re-sampling, or conversion from time domain to spatial domain, is performed based at lest in part on measured samples of the time sampled speed of the moving component. A set of wavelet envelopes, corresponding to one or more wavelet scales, of the new or converted samples of the vibration signal are then calculated. A Fourrier transform is then applied to the calculated set of wavelet envelopes and one or more spectral energy concentrations of the wavelet envelopes are determined at one or more expected defect frequencies. The condition of the moving component is then determined based, at least in part, on the calculated spectral energy concentration(s).

The determination of the condition of the moving component may include comparing the calculated spectral energy concentration(s), or any function thereof, to one or more thresholds or applying feature classification to the calculated spectral energy concentration(s). If feature classification is employed, other features may also be calculated, using the measured samples of the vibration signal, and classified. The wavelet-based multi-scale enveloping order spectrogram process, however, may perform better than the described alternative defect detection/diagnosis process, specifically, when the region of interest for moving component defect diagnosis is associated with high frequency resonance.

The rationale for analysing high frequency resonance is that resonant modes may be excited when rolling elements roll over the defect. The associated frequency components are typically concentrated within a narrow band of a high frequency. If computed order tracking is firstly performed on the vibration signals, the operation of angular re-sampling acts as an interpolation, which has the property of low-pass filtering. As a result, it may lead to aliasing and smearing of the frequency band of interest, in the angle domain, diminishing the effectiveness of the defect diagnosis.

Figure 11A:
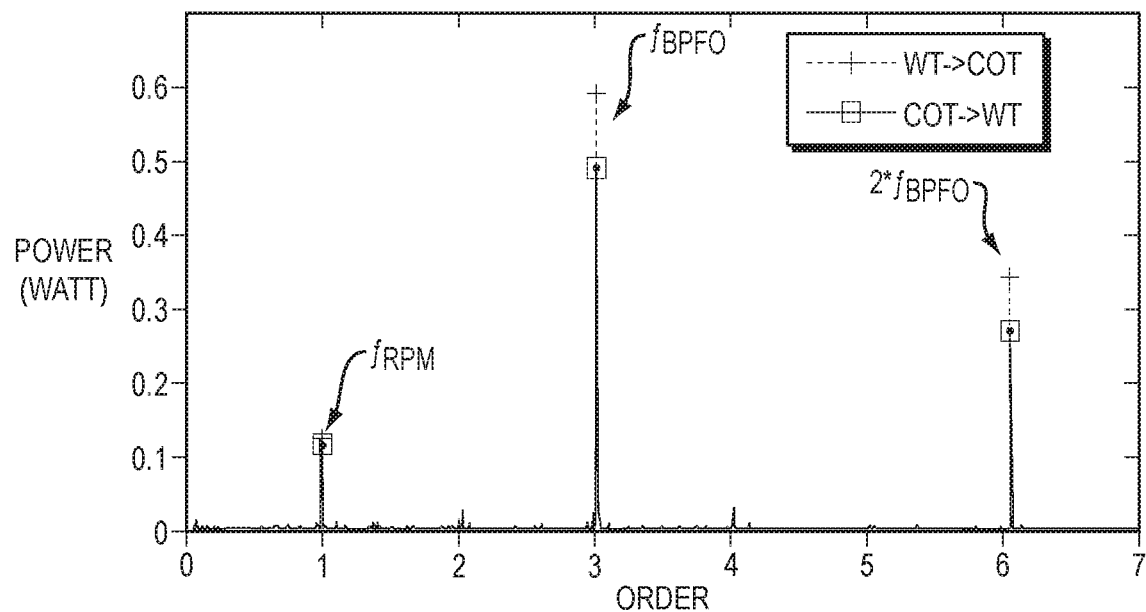
FIGS. 11A and 11B illustrate difference in experimental results between the wavelet-based multi-scale enveloping order spectrogram process and other methods.

To understand the effect of the order of executing the wavelet transform and the computed order tracking or re-sampling to convert to rotational angle domain, the performance of multi-scale enveloping-order spectrogram method is compared with another example method where computed order tracking, or re-sampling, is performed first on the vibration signal and wavelet envelopes are computed using the re-sampled vibration signal. Applying both methods to vibration signals from a bearing with outer raceway defect, the corresponding results are shown in FIG. 11A. The term WT->COT refers to the multi-scale enveloping-order spectrogram method where wavelet transform is performed first and computed order tracking is then applied to wavelet envelopes. The term COT->WT refers to the other example method where computed order tracking is performed first on the vibration signal and the wavelet envelopes are then computed using the re-sampled vibration signal. It is seen that approximately $\{(0.59-0.50)/0.50\}\times 100\%=18\%$ improvement may be achieved the amplitudes of the calculated power concentration at the expected defect frequencies.

Figure 11B:
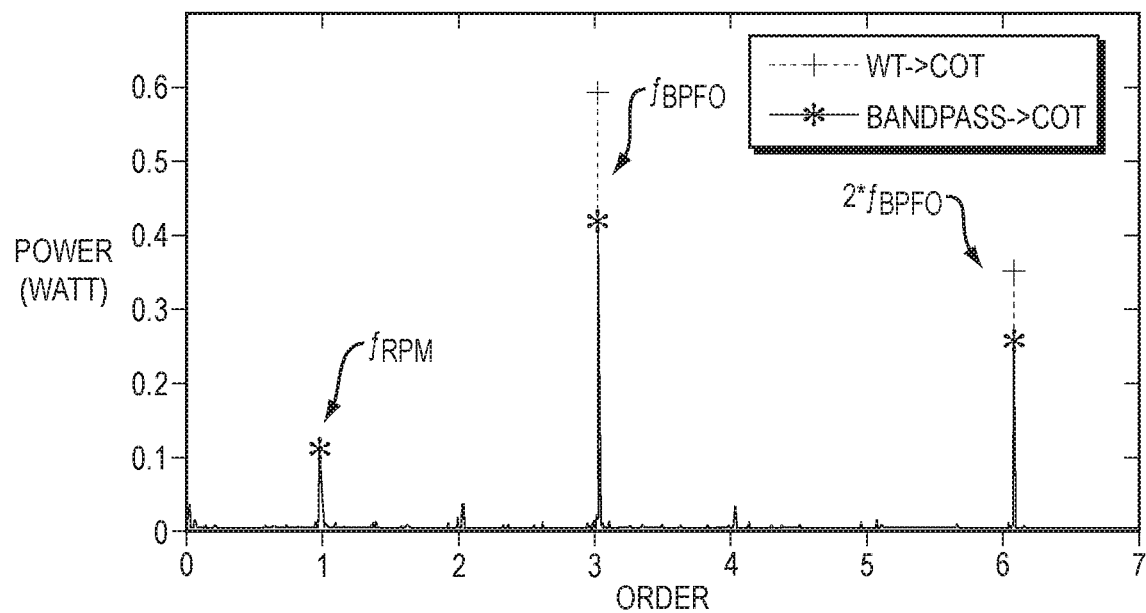

The performance of the multi-scale enveloping-order spectrogram method is also compared with the conventional enveloping order spectrum method. As shown in FIG. 11B, the wavelet-based multi-scale enveloping order spectrogram process has better defect frequency identification capability, by approximately 0.59–0.42)/0.42=40%, as compared to the conventional enveloping order spectrum method.

The examples described above with respect to multi-scale enveloping-order spectrogram make use of the rotational speed and acceleration, or vibration, signals to calculate spectral energy concentrations at one or more expected defect frequencies for one or more wavelet scales. A person skilled in the art should appreciate that speed and acceleration are two representations or characteristics of motion, and as such other representations or characteristics of motion may be used. In other example embodiments, acceleration and jerk, or rate of change of acceleration, signals may be used instead of the speed and acceleration, respectively. A person skilled in the art should also appreciate that the described examples are not to be limited to rotational motion and may be employed with translational motion. As such, the re-sampling would be based, in general, on constant increments of spatial displacements, e.g. rotational angle increments, increments in translational distance, or increments in any other spatial displacement.

In other words, wavelets envelopes of a time sampled first representation of motion are computed at one or more wavelet scales. The computed wavelet envelopes are then converted from time domain to spatial domain based on measured samples of a time sampled second representation of motion. For example, the first representation of motion is acceleration and the second representation of motion is speed. In another example, the first representation of motion is jerk and the second representation is acceleration. In the both examples, motion may be rotational, translational, or any other motion.

Defect Diagnosis in Induction Motors Based on Motor Current Envelope

When an abnormality such as broken rotor bar occurs in an induction motor, the line frequency is the modulation between the supply, or source, frequency $f_d$ and the fault-introduced frequency $2\,ksf_s$:

$$I(t) = \cos(2\pi f_s t)(1 + m_1 \cdot \cos(2\pi(2sf_s)t) + m_2 \cdot \cos(2\pi(4sf_s)t) + \ldots) \quad (18)$$

where k is an integer number, s is the motor slip, and m is the modulation index related to the severity of defect. Using the Hilbert transform, the envelope or the amplitude modulus of the motor current is calculated as:

$$\mathrm{Env}(I(t)) = 1 + m_1 \cdot \cos(2\pi(2sf_s)t) + m_2 \cdot \cos(2\pi(4sf_s)t) + \ldots \quad (19)$$

Figure 12:
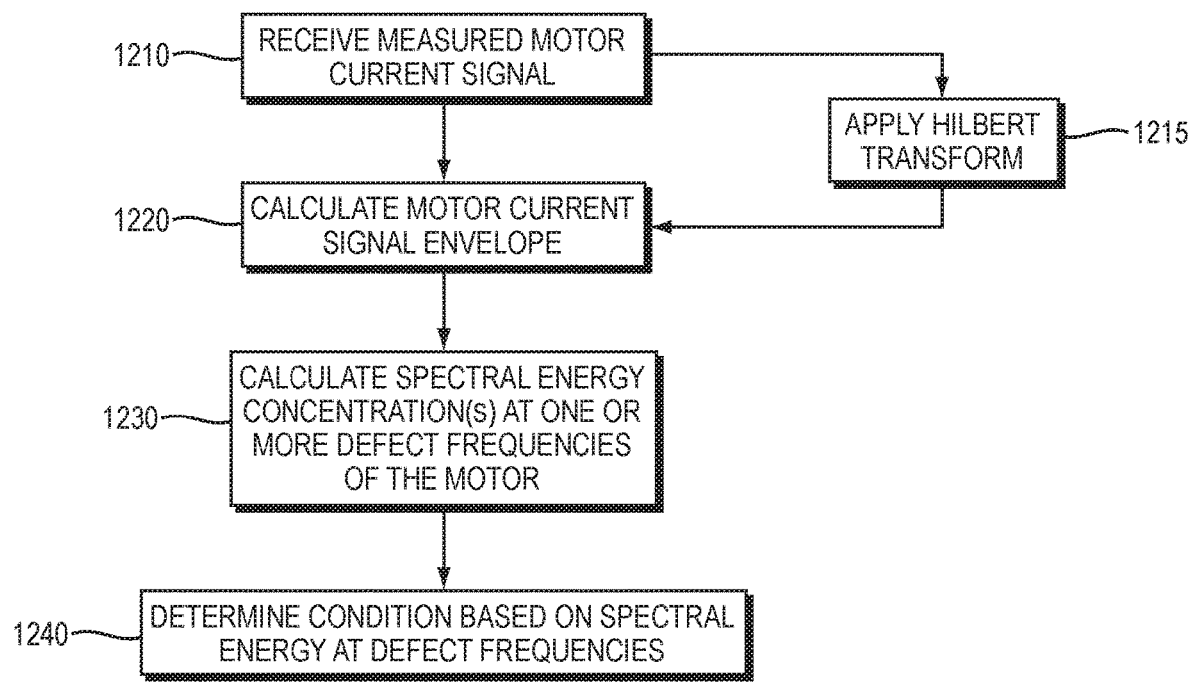
FIG. 12 is flow chart diagram illustrating an example process for defect detection in a motor using motor current envelope.

FIG. 12 is flow chart diagram illustrating an example process for defect detection in a motor using motor current envelope. At 1210, measured motor current is acquired. At 1215 the Hilbert transform of the measured motor current is computed. At 1220, the measured motor current and its Hilbert transform are used to calculate the motor current envelope. At 1230, spectral energy concentration(s) of the motor current envelope at one or more defect frequencies of the motor is/are calculated. The calculation of the spectral energy may be obtained, for example, by computing the Fourier transform of the motor current envelope and then calculating the power at the defect frequencies. Using the calculated spectral energy concentration(s), the condition of the motor is determined at 1240. In determining the condition of the motor, the calculated spectral energy concentration(s), or a function thereof, may be compared to one or more thresholds. Alternatively, the calculated spectral energy concentration(s) may be classified according to pattern classifiers constructed using motor current envelope training data.

Figure 13A:
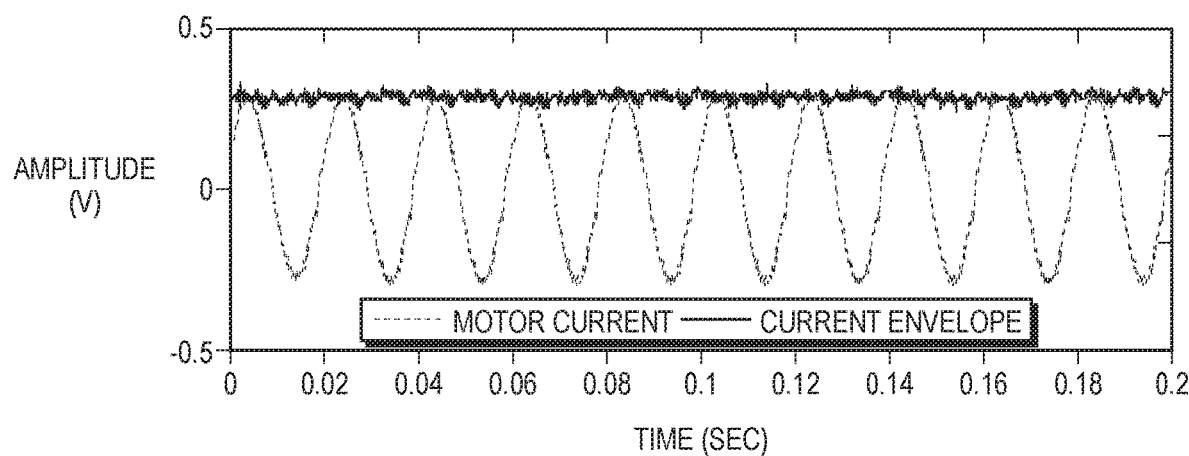
FIGS. 13A through 13C show experimental results for induction motor diagnosis based on motor current and motor current envelope.
Figure 13B:
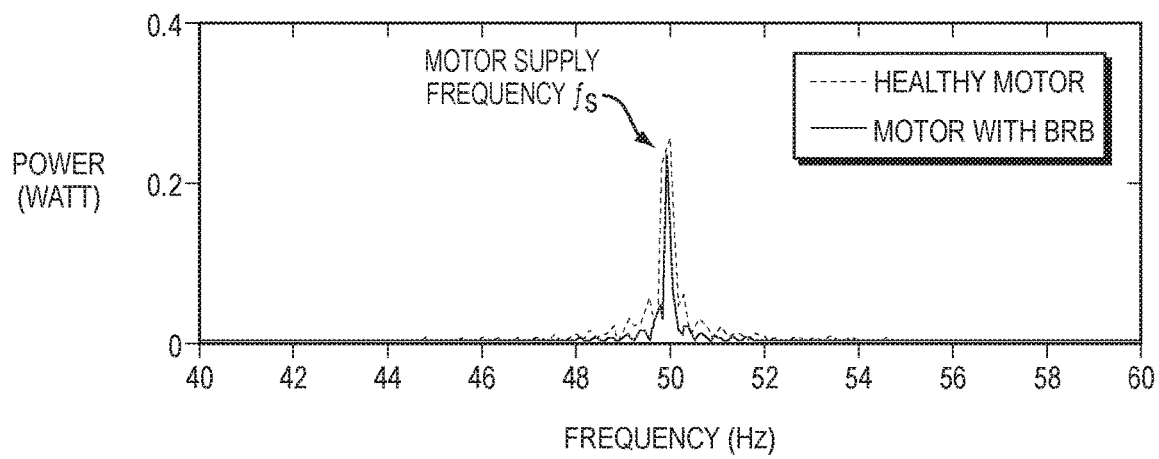
Figure 13C:
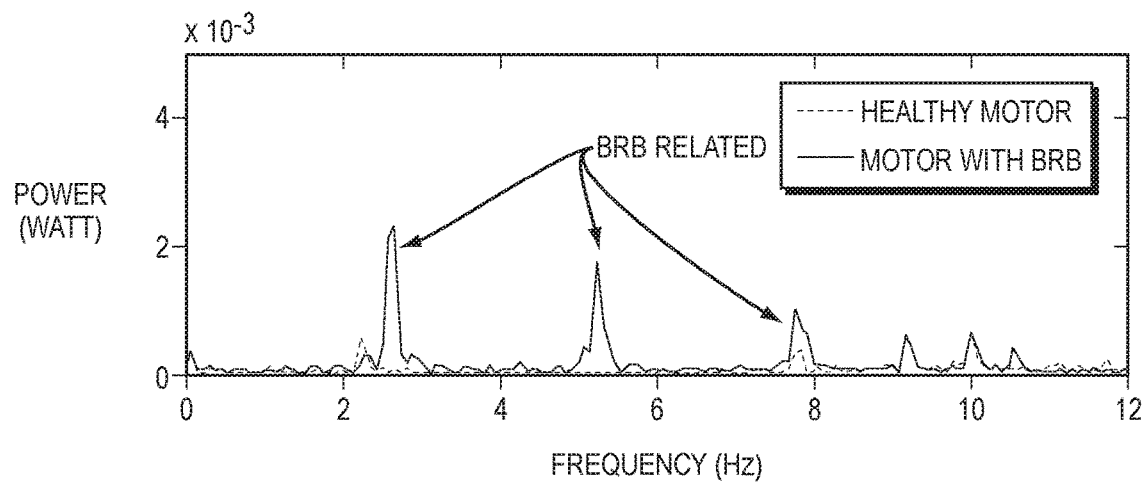

Analyzing a motor with broken rotor bar, as an example, FIG. 13A shows the difference between the motor current and current envelope. FIG. 13B illustrates the spectrum comparison, using motor current, between a healthy motor and a motor with broken rotor bar. From FIG. 13B, it is difficult to identify the difference between the healthy motor and the motor with a broken rotor bar. This is because most of the spectral energy, in the motor current spectrum, is associated with the motor supply frequency. As such, the defect related frequencies are hard to be identify from spectrum analysis of the motor current. Expected defect frequencies are known to be of the form $(1\pm2\,ks)f_s$. In the example of FIG. 13B, $s\in[0.02\;0.04]$ and the expected defect frequencies $(1\pm2\,ks)f_s$ are in the range of 40 Hz to 60 Hz. FIG. 13C shows the current envelope spectrum comparison between a healthy motor and a motor with a broken rotor bar. It is clear that the energies at the defect related frequencies $2\,ksf_s$, $s\in[0.02\;0.04]$, $2\,ksf_s$ are in the range of 0 and 12 Hz in motor with broken rotor bar are higher than the ones from the healthy motor. The reason is because the current envelope eliminates the effect of motor current, as illustrated in equation (19) and manifest defect-related features better.

Based on the analysis of FIGS. 13A through 13C, defects in the motor are detected by checking the energy, or power, concentration at expected defect frequencies. For example, the calculated energy, or power, values at one or more expected defect frequencies are compared to one or more respective threshold to determine whether or not there is a defect.

Figure 14:
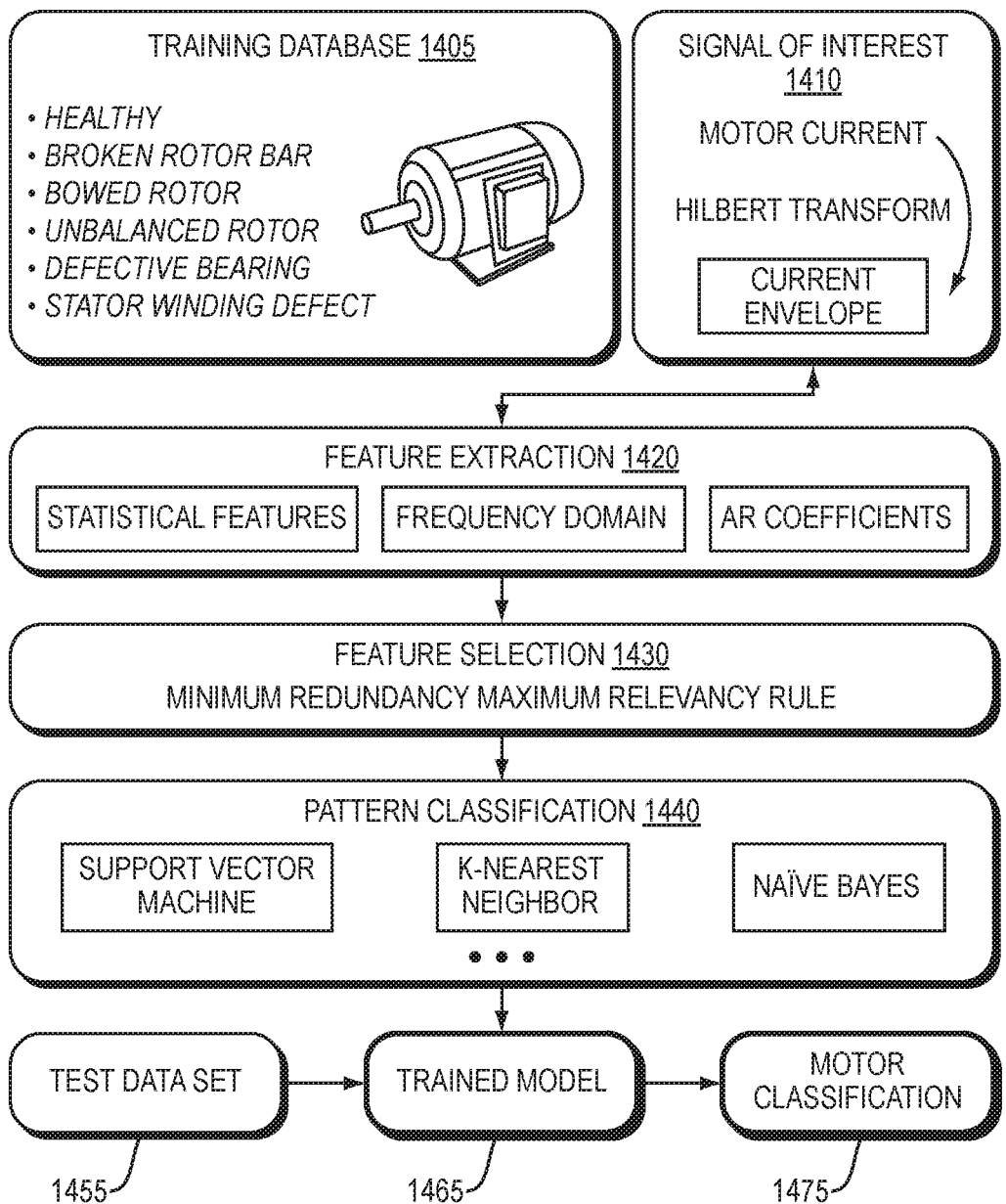
FIG. 14 illustrates a framework for motor defect classification.

FIG. 14 shows a framework for motor defect classification based on motor current envelope. At 1410 motor current envelope is computed from measured motor current signal using the Hilbert transform. At 1420 different features are calculated or extracted from the calculated motor current envelope. The calculated or extracted features may be statistical features, frequency domain features, autoregressive features, or a combination thereof. The calculated or extracted features are then filtered, at 1430, and a subset of the calculated or extracted features is selected, for example, based on the minimum Redundancy Maximum Relevancy mRMR feature selection method. Other feature selection methods, known in the art, may be used. The selected features are then classified into patterns, at 1440, using classifiers. The feature selection or filtering may be optional, according to at least one aspect where all the calculated or extracted features are selected. The process described by 1410 to 1440 is usually repeated for multiple training data motor current signals. As shown in 1405, the training motor current data preferably correspond to different operational conditions of the motor, e.g., healthy, broken rotor bar, bowed rotor, unbalanced rotor, defective bearing, stator winding defect, and the like. At the end of the training process, a trained model with classification patterns is achieved at 1465. Each new motor current signal or test set 1455 is mapped to one of the classification patterns of the trained model 1465 to achieve a classification of the motor condition at 1475.

A classifier is a computational tool that identifies an unknown class of signals from a trained model. Mathematically, a classifier is a function $f$ that maps a set of input feature vectors $x \in \chi$ to an output class $y \in \{1, \ldots, C\}$, where $\chi$ represents the feature space, and the output class is labeled as $\{1, \ldots, C\}$. The function $f$ may be estimated by supervised learning from labeled training data sets $(x_n, y_n)$, with $n=1:N$, where N is the total number of available training data set. In the following, several representative classifiers, such as Naïve Bayes, k-Nearest Neighbor, and Support Vector Machine, are briefly introduced.

Naïve Bayes: The Naïve Bayes (NB) classifier represents a probabilistic approach to signal classification, based on Bayes' theorem. Given an unclassified object with its feature vector x, the Naive Bayes classifier considers the object x as the class $y_i$, which has the highest posterior probability $P(y_i|x)$ conditioned on x. According to the Bayes theorem, the probability may be expressed as:

$$P(y_i \mid x) = \frac{P(x \mid y_i) P(y_i)}{P(x)} \quad (20)$$

Since P(x) is the same for all the classes, and $P(y_i)$ may be determined from the training data set, determining the conditional probability $P(x|y_i)$ is critical to calculating $P(y_i|x)$. In general, determination of $P(x|y_i)$ is computationally intensive and requires a large training set. The Naïve Bayes model simplifies the estimation of $P(x|y_i)$ by assuming:

$$P(x \mid y_i) = \prod_{k=1}^{N} P(x_k \mid y_i) \quad (21)$$

The Naïve Bayes classifier combines this model with decision rule by choosing the maximum posteriori probability. The corresponding classifier is the function defined as follows:

$$f = \mathrm{argmax} P(y_i) \prod_{i=1}^{N} P(x_i \mid y_i) \quad (22)$$

K-nearest Neighbor: K-nearest neighbor (k-NN) is a classifier for classifying object based on k-nearest distances in the feature space $\chi$ of the training sets. The class of unclassified object may be determined by majority vote among these k-nearest neighbor classes. The Euclidean distance measure is often used to calculate the distance between the test data set and training samples, as defined by:

$$D(\mu, v)^2 = \|\mu - v\|^2 = (\mu - v)^T(\mu - v) = \sum_{i=1}^{d}(\mu_i - v_i)^2 \quad (23)$$

where $\mu$ and $v$ represent the feature vectors from the test data set and the training samples, respectively, and d is the dimension of the feature vector. An alternative distance measure is the Mahalanobis distance, which enables different weighting schemes to be associated with different features.

$$\begin{aligned} D(\mu, v)^2 &= \|\mu - v\|^2 \\ &= (\mu - v)^T \Sigma (\mu - v) \\ &= \sum_i \sum_j (\mu_i - v_i) \Sigma_{ij} (\mu_j - v_j) \end{aligned} \quad (24)$$

where $\Sigma$ is a symmetric and positive definite matrix, which may be obtained through estimation of the covariance matrix. Because of the ability in weighting, the k-nearest neighbor algorithm identifies the class of test data set by finding the closest neighbors as expressed by:

$$\hat{y}(\mu) = y_{n^*}, \text{ where } n^* = \mathrm{arg\,min}\, D(\mu, v)^2 \quad (25)$$

Support Vector Machine: Support vector machine (SVM) is a pattern classification technique based on statistical learning theory. Compared with other classifiers such as artificial neural networks (ANN), SVM has good generalization ability and the corresponding training model typically converges with less training samples. SVM transforms the original feature space into a higher dimensional space to determine an optimal hyper-plane by maximizing the separation distances among the classes. Given an input training data set $x \in \chi$, the transformed higher dimensional feature space may be obtained as:

$$x' = \phi(x) \quad (26)$$

where $\phi$ is the transformation function. Assuming two classes $y \in \{1, -1\}$ labeled as positive class $y_i=1$ and negative class $y_i=-1$, a hyper-plane $f(x')=0$ may be determined as:

$$f(x') = w^T X' + b = \sum_{j=1}^{n} w_j x'_j + b = 0 \quad (27)$$

where w is a n-dimensional vector and b is a scalar. The vector w and scalar b are used to define the position of separating hyper-plane. This hyper-plane is built to maximize the distance among the closest classes through the following optimization.

$$\max_{w \in R^n, b \in R} D, \text{ subject to } y_i(w^T x'_i + b) \geq D, \forall i \quad (28)$$

where D is the distance of the closest class to the hyper-plane and may be set as $1/\|w\|$ after normalization. Taking into account the noise with slack variables $\xi_i$ and the error penalty C, Equation (8) may be rewritten as:

$$\min_{w, \xi_i \in R^n, b \in R} \left\{ \frac{1}{2} \|w\|^2 + C \sum_{i=1}^{N} \xi_i \right\} \quad (29)$$

subject to $\xi_i \geq 0$, $y_i(w^T \phi(x_i) + b) \geq 1 - \xi_i, \forall i$

Then the hyper-plane may be determined as the following sign function ($\mathrm{sgn}(t)=1$ for $t \geq 0$, and $\mathrm{sgn}(t)=-1$ for $t<0$)

$$f(x) = \mathrm{sgn}\left( \sum_{i=1}^{N} y_i \alpha_i \phi(x_i)^T \phi(x) + b \right) \quad (30)$$

Then, the hyper-plane function may be determined by kernel function $K(x_i, x) = \phi(x_i)^T \phi(x)$ by computing the inner products without specifying the explicit form of transformation function $\phi$. Different kernels may be formulated as listed in Table 1, where $\gamma$ is a kernel parameter, C is a cost parameter in the kernel function, and d denotes the degree of polynomial function. Specifically, the Gaussian RBF kernel is used in this study due to its popularity and reported good performance in machinery condition monitoring [29]. Accordingly, the associated decision function is expressed as:

$$f(x) = \mathrm{sgn}\left( \sum_{i=1}^{N} y_i \alpha_i K(x_i, x) + b \right) \quad (31)$$

TABLE 1

Formulation of kernel functions

| Kernel | Expression |
|---|---|
| Linear | $x^T x_j$ |
| Polynomial | $(\gamma x^T x_j + C)^d, \gamma > 0$ |
| Gaussian RBF | $\exp[-\|x - x_j\|^2 / (2\gamma^2)]$ |
| Sigmoid | $\tanh[\gamma x^T x_j + C]$ |

Autoregressive Model: Autoregressive model is a widely used parametric modeling technique with applications in speech processing, mechanical system modeling and system identification. Parametric methods are available for modeling mechanical systems. Theoretically, a deterministic random process may be predicted based on infinite past observations.

$$x[n] = -\sum_{k=1}^{\infty} \alpha[k] x[n-k] \qquad (32)$$

where $x[n]$ is time-series data point, and $\alpha[k]$ represents the autoregressive coefficients. Parameters n and k represent the time index and dummy number, respectively. Equation (32) may be approximated by its finite (p) preceding values, expressed by a linear regression on the time series points plus an error term:

$$x[n] = -\sum_{k=1}^{p} \alpha[k] x[n-k] + e[n] \qquad (33)$$

where p is the model order, $e[n]$ is the error term, which is a Gaussian white noise series with zero means and the variance $\sigma^2$. The AR coefficients may be estimated by different approaches, such as the least square method or Yule-Walker equations. In this paper, the Yule-Walker method has been investigated for its improved computational efficiency. An important issue is AR modeling is to select the model order. Three popular model order selection criteria are: Akaike Information Criterion (AIC), Final Prediction Error (FPE), and minimum description length (MDL), which are shown below:

$$AIC(d) = \log V + 2d/N \qquad (34)$$

$$FPE(d) = V\left(\frac{1 + d/N}{1 - d/N}\right) \qquad (35)$$

$$MDL(d) = V(1 + d\ln N / N) \qquad (36)$$

In the above equations, V is the loss function, d is the order of the AR model, and N is the number of observations for fitting the model. According to these three criteria, the most accurate model has the smallest criterion value. It is known that the AIC criterion suffers from over-fitting, and FPE and MDL yield better order selection performance, as discussed in the following section.

The experimental setup described in FIG. 2 is used to conduct experiments for motor defect classification. In the experimental study, six motors with identical models but different incipient defects are investigated. They are power supplied with supply or source current of the same frequency, e.g., 50 Hz, and are tested under same loading conditions. Table 2 describes the different conditions of the motors.

TABLE 2

Test conditions of induction motors

| Index | Fault Condition | Fault Description |
|---|---|---|
| M1 | Normal motor | Healthy, no defect |
| M2 | Broken bar | Three broken rotor bars |
| | Bowed rotor | Rotor bent in the center 0.01" |
| M4 | Unbalanced rotor | Unbalance created by adding 3 washers on the rotor |
| M5 | Stator winding defect | 3 turns shorted in stator winding |
| M6 | Defective bearing | Inner race defect bearing in the shaft end |

After motor current signals are collected from the six tested motors, current envelope, c(t), is computed using the Hilbert transform according to:

$$c(t) = \sqrt{I(t)^2 + \tilde{I}(t)^2} \qquad (37)$$

where c(t) is the envelope of the current signal I(t) and $\tilde{I}(t)$ is the Hilbert Transform of motor current signal. A total of 23 features were extracted for motor defect detection. The features are described in Table 3 according to three categories: time domain statistical features, frequency domain features, and AR coefficients.

TABLE 3

List of extracted features

| Domain | Features | Expression |
|---|---|---|
| Statistical | RMS | $x_{RMS} = \sqrt{\frac{1}{n}(x_1^2 + x_2^2 + \cdots + x_n^2)}$ |
| | Skewness | $x_{SKEW} = \frac{1}{n}\sum_n \left(\frac{x_i - \mu}{\sigma}\right)^3$ |
| | Kurtosis | $x_{KURT} = \frac{1}{n}\sum_n \left(\frac{x_i - \mu}{\sigma}\right)^4$ |
| | Entropy | $x_{ENTR} = -\sum_{i=1}^{n} P(x_i) \log P(x_i)$ |
| | Crest factor | $C_F = \max |x_i|/x_{RMS}$ |
| Frequency | Air-gap eccentricity | Power at: $f_{ECE} = f_S[1 \pm k(1-s)/p]$ |
| | Broken bar | Power at: $f_{BRB} = (1 \pm 2ks)f_S$ |
| | bearing | Power at: $f_{BNG} = f_S \pm k f_{defect}$ |
| Model | AR coefficients | $x_i = \sum_{i=1}^{N} a_i x_{i-1} + \xi_i$ |

Statistical features: Five statistical features from the measured motor current and current envelope were extracted including the root mean square (RMS), Skewness, Kurtosis, Entropy, and crest factor. The RMS is a measure for the magnitude of a varying quantity. It is also related with the energy of the signal. Skewness is used to characterize the degree of signal asymmetry of the distribution around its mean, and Kurtosis indicates the spikiness of the signal. The crest factor is calculated from the peak value divided by the RMS value of the signal. According to the information theory, entropy provides a quantitative measure of the uncertainty associated with the signal.

Frequency features: Features from the frequency domain provide another perspective of the motor current and current envelope, and reveal information that are otherwise not found in the time domain. In this study, the energies at motor defect characteristic frequencies of broken bar ($f_{BRB}$), air-gap eccentricity ($f_{ECE}$), and defective bearing ($f_{BNG}$), have been extracted to construct the feature vector:

$$f_{BRB}=(1\pm 2ks)f_s \qquad (38)$$

$$f_{ECE}=f_s[1\pm k(1-s)/p] \qquad (39)$$

$$f_{BNG}=f_s\pm kf_{defect} \qquad (40)$$

In the above equations, $f_s$ is the motor supply frequency, s is the slip of motor, k=1, 2, 3, . . . , p is the number of poles of the induction motor, and $f_{defect}$ is the bearing defect frequency, which may be calculated based on the number of rolling elements and dimensions of the inner race, outer race, and rolling elements. All the parameters except the motor slip s are known. Instead of estimating the value of s, an EEMD algorithm has been developed to extract the defect characteristic frequencies, as illustrated in equations. (38-40). As discussed above, motor current is an amplitude-modulated signal of the motor supply frequency ($f_s$), with defect characteristic frequencies such as 2 $ksf_s$, $k(1-s)f_s/p$, and $kf_{defect}$. Through a Hilbert transform-based envelope analysis, the defect characteristic frequencies may be demodulated and extracted by eliminating the motor supply frequency in the motor current envelope signal. In FIG. 12, a comparison between the results of using motor current and current envelope is shown. Since the motor supply frequency contains a major portion of the signal energy, and dominates in the motor current, it is difficult to identify the sideband harmonic signal that is indicative of the broken rotor bar characteristic frequency ($f_{BRB}$). This is illustrated in FIG. 3(b), where the spectra of signals from a healthy motor and a motor with a broken bar are difficult to be differentiated. In comparison, the spectral comparison in FIG. 3(c) using the current envelopes between the healthy motor and motor with broken bar has clearly shown the difference in the energy concentration associated with the broken rotor bar-related frequencies (2 $ksf_s$). This confirms the effectiveness of current envelope in manifesting defect related features.

Figure 15A:
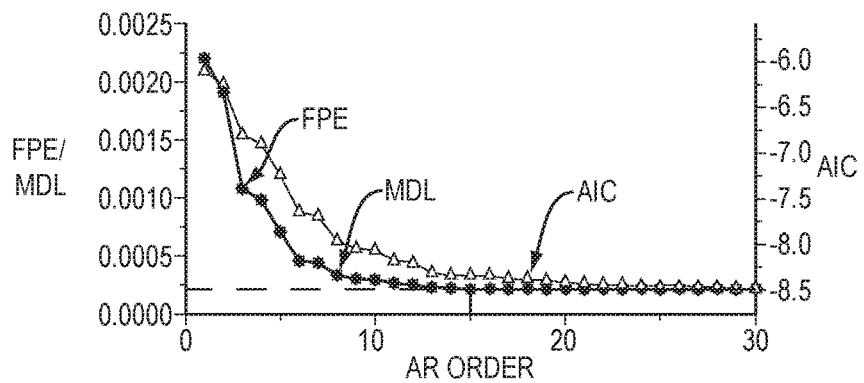
FIGS. 15A through 15D illustrate feature selection methods.
Figure 15B:
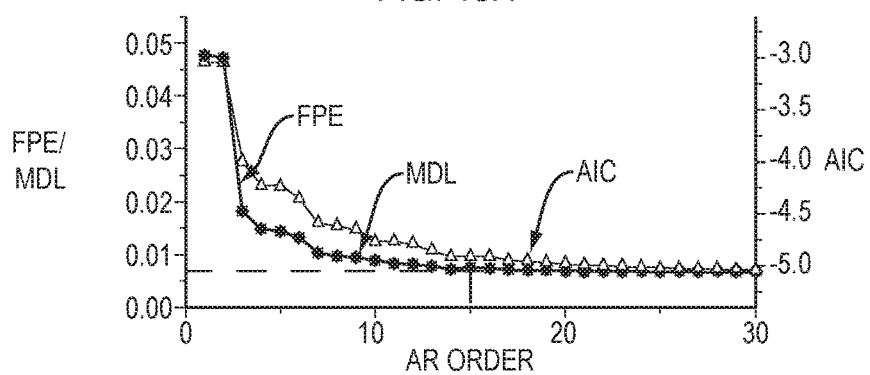

AR coefficients: There are two example scenarios of using features related to AR models. The first one is to use residue signal derived from the AR coefficient of normal condition, whereas the second is to use the AR coefficients as the feature. The first scenario constitutes a pre-whitening operation, which has the same data points with the original signal. As an example of reducing the dimension of a feature vector, AR coefficients are chosen as the features in this study. The number of AR coefficients, which corresponds to the model order, may be determined according to one or more criteria. Criteria for order selection, such as Akaike Information Criterion (AIC), Final Prediction Error (FPE) criterion, and Minimum description Length (MDL) criterion, are illustrated in FIGS. 15A and 15B. It is seen that both the FPE and MDL criteria yield similar results, while AIC approached its steady state value slowly, due to an over-fitting problem. In the experimental study, order 15 has been selected based on FPE and MDL criteria, since higher model order did not further improve the model accuracy. Accordingly, the first fifteen coefficients of the AR model were extracted and selected as the features for both the motor current and the current envelope.

Figure 15C:
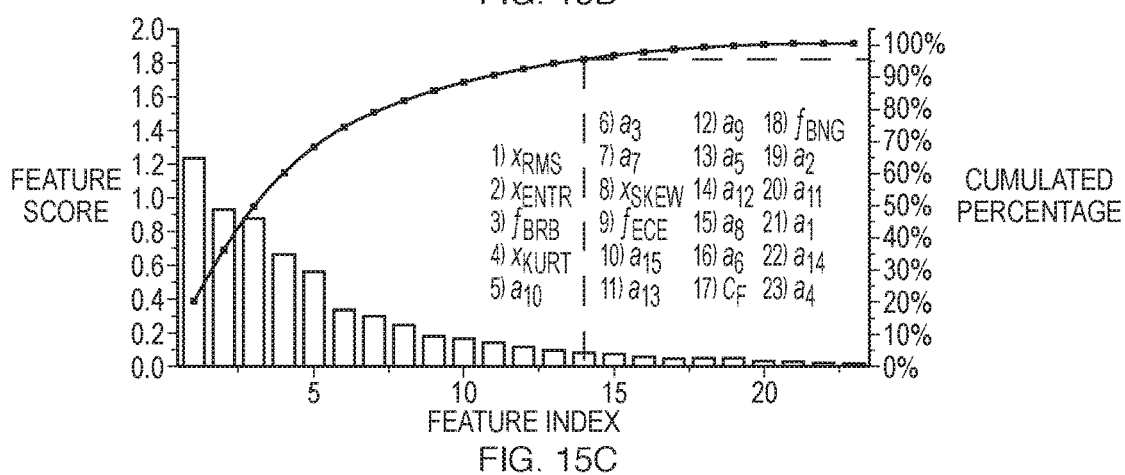
Figure 15D:
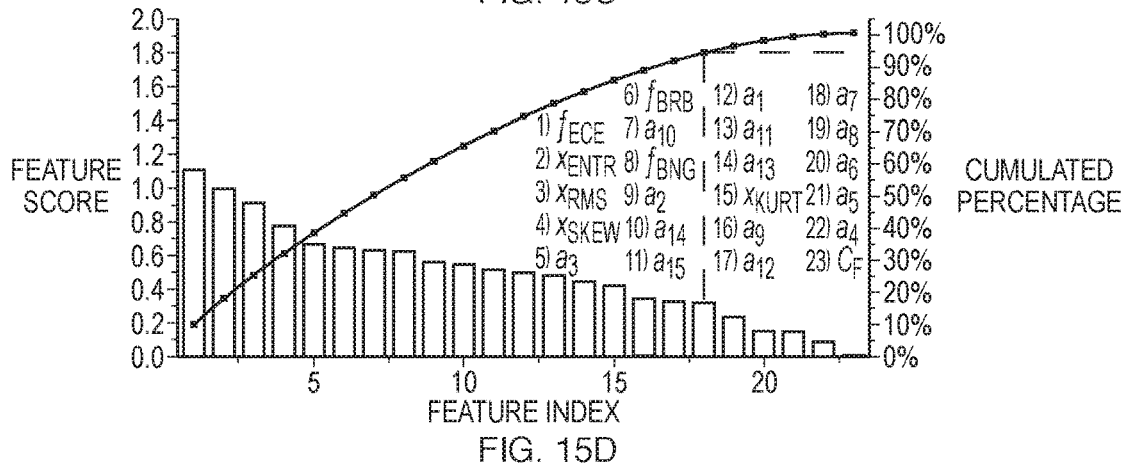

A number of features may be extracted from the measurements for representing the original signals for motor defect classification. However, these features may contain redundant information. For improved computational efficiency in classification, a feature selection strategy is employed to remove irrelevant and redundant features and lower the dimension of the feature space. An example feature selection technique is the minimum Redundancy Maximum Relevancy (mRMR) feature selection method. The mRMR method measures the relevance and redundancy of the feature candidates based on mutual information, and selects a "dominant" feature subset that has maximal relevance and minimal redundancy at a low time expense. Due to such merit, the mRMR method is investigated in this study. However, other features selection techniques known in the art, such as Sequential Backward Selection (SBS) method, genetic algorithm, Principle Component Analysis (PCA) method, and Independent Component Analysis (ICA) method, may be used. After performing mRMR, the score, e.g., the difference between the relevance and redundancy, of each feature is obtained. A cumulated score percentage curve with the feature number is shown in FIGS. 15C and 15D, which corresponds to the features from motor current and current envelope, respectively. A criterion of 95% is set to select the dominant feature in this study, since it contains the most information of these feature sets. It is clear that 15 features from motor current and 18 features from current envelope are selected, respectively.

In the experimental study, three different pattern classifiers, including k-NN, NB, and SVM have been studied for feature performance evaluation. A parameter of k-NN, e.g., the number of nearest neighbors, is determined through a 5-fold cross validation during the training process, and the one which yielded the best recognition rate is selected. Euclidean distance is chosen as the distance metric for k-NN. For the NB classifier, normal distribution of the data is assumed. To build an SVM model, two parameters, the cost parameter C and Gaussian kernel parameter y, have been selected through a 5-fold cross validation process to prevent over-fitting. The recognition accuracy of motor defects from these three classifiers follows a leave-one-out cross validation procedure.

Figure 16A:
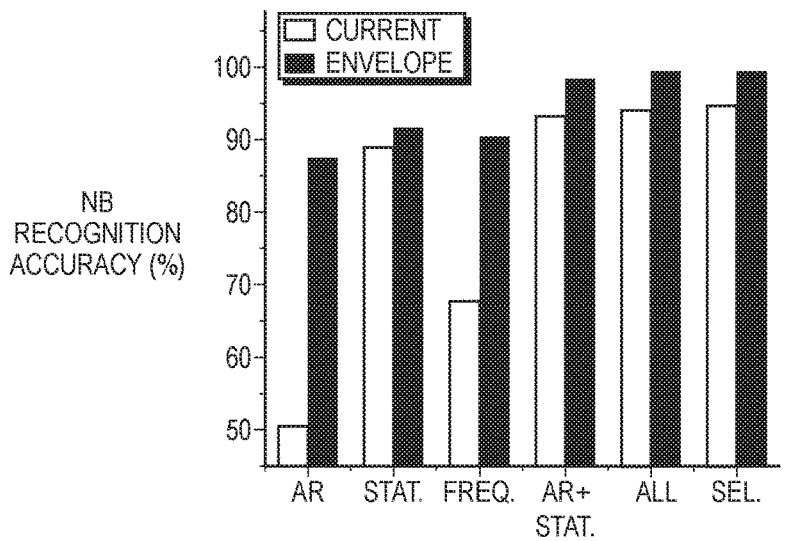
FIGS. 16A through 16C illustrate a performance comparison of features for motor current and motor current envelope using different classifiers.
Figure 16B:
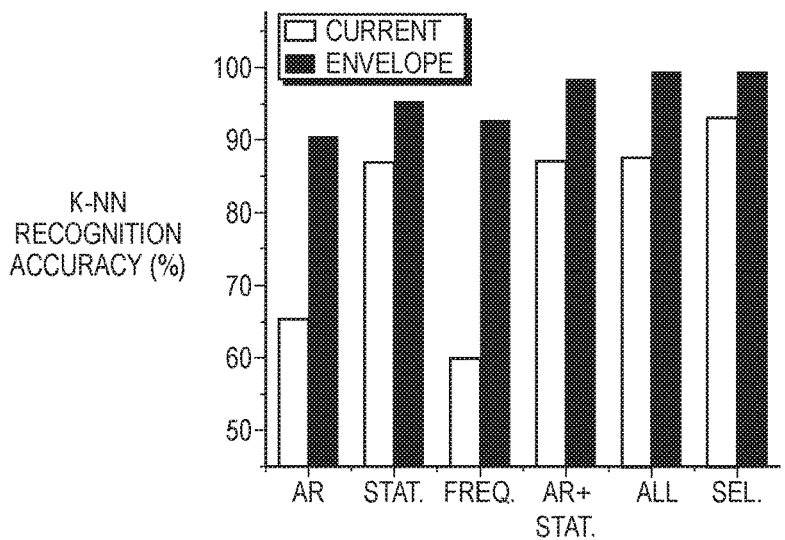
Figure 16C:
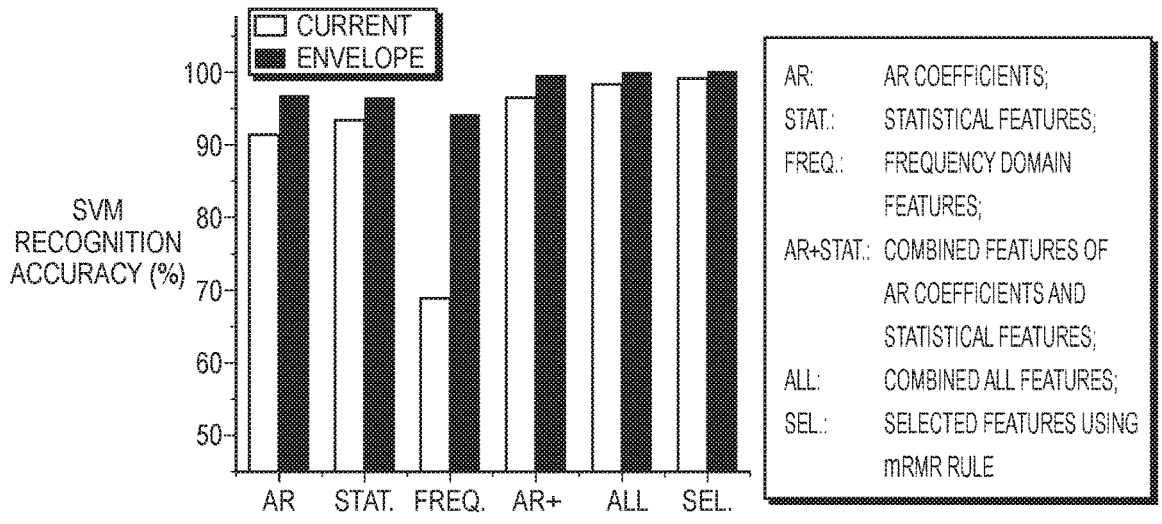

A total of 600 sets of features vectors corresponding to six different motors were extracted from the motor current and current envelope signals, respectively. Each set of the feature vectors was composed of five statistical features, three features from the frequency domain, and fifteen AR coefficients. According to the mRMR approach, fifteen features were selected from the motor current and eighteen features were selected from current envelope as the dominant features, respectively. To compare the features' significance between the motor current and current envelope, the statistical features, features from frequency domain, AR coefficients, their combinations, and selected features were fed into the three classifiers, and the results are shown in FIGS. 16A to 16C and Table 4, respectively. It is clear that the recognition accuracy has been improved significantly using the individual features from the current envelope, comparing with the ones from the motor current. For example, classification accuracy has been improved from 50.5% to 87.3% by using the features of AR coefficients for the current envelope. Combined and selected features have also shown improved classification accuracy as compared with the individual features, e.g., statistical features, features from frequency domain, AR coefficients. Based on the experimental evaluation, it is seen that features from the current envelope have consistently outperformed the ones from the motor current. Because motor supply frequency dominates in the motor current signal, features from the current would be less effective for identifying defective rotors than from the current envelope. As current envelopes do not involve the motor supply frequency, classification accuracy is higher.

TABLE 4

Comparison of classification accuracy using different features from motor current and current envelope

| | ACC (%) | | | | | |
|---|---|---|---|---|---|---|
| | NB | | k-NN | | SVM | |
| Features | Cur. | Env. | Cur. | Env. | Cur. | Env. |
| AR | 50.5 | 87.3 | 65.3 | 90.5 | 91.5 | 97.2 |
| Stat. | 89 | 91.7 | 86.8 | 95.7 | 93.7 | 96.5 |
| Freq. | 68 | 90.3 | 60.2 | 92.5 | 69.2 | 94 |
| AR + Stat. | 93.3 | 98.5 | 87.2 | 98.7 | 96.5 | 99.7 |
| Combined all | 94 | 99.5 | 87.8 | 99.7 | 98.7 | 99.8 |
| Selected | 94.7 | 99.7 | 92.8 | 99.8 | 99 | 100 |

Additionally, the effect of different kernel functions on the performance of SVM model is investigated. Four different kernel functions, as shown in Table 1, are tested using the extracted feature sets from the motor current, and the results are summarized in Table 5. It is clear that the Gaussian RBF kernel presents consistent higher classification accuracy than other kernel functions, validating the effectiveness of envelope analysis in defect identification and diagnosis of induction motors.

TABLE 5

Effect of different kernel functions in SVM model

| | ACC (%) | | | |
|---|---|---|---|---|
| Features | Linear | Poly-nomial | Gaussian | Sigmoid |
| AR | 90.8 | 91.3 | 91.5 | 65.8 |
| Stat. | 91.2 | 90.3 | 93.7 | 91 |
| Freq. | 60.8 | 68.7 | 69.2 | 60.5 |
| AR + Stat. | 94.5 | 93.7 | 96.5 | 92.3 |
| Combined all | 98.2 | 98.5 | 98.7 | 91.5 |
| Selected | 97.8 | 98 | 99 | 96.2 |

According to another aspect, a multi-sensor measurement system integrated with computational algorithms for the online, real-time condition monitoring and health diagnosis of drilling rigs is provided. The system allows alarms to be set or warnings to be displayed to provide indication of the level of structural defects in the drilling rig, or other mechanical system. Based on a logic rule model, the progression of the defect, or degree of degradation of the equipment, may be specified. This establishes the basis for predicting the rig's remaining service life. The logic rule model is established on the basis of multi-dimensional feature extraction, feature selection, and pattern recognition techniques. In addition to monitoring the rig's statues based on continued data streaming, routine examination and quantification of the health of the drilling rig, under quantifiable and consistent test conditions may be performed to ensure consistency in the testing of drilling rigs.

Figure 17:
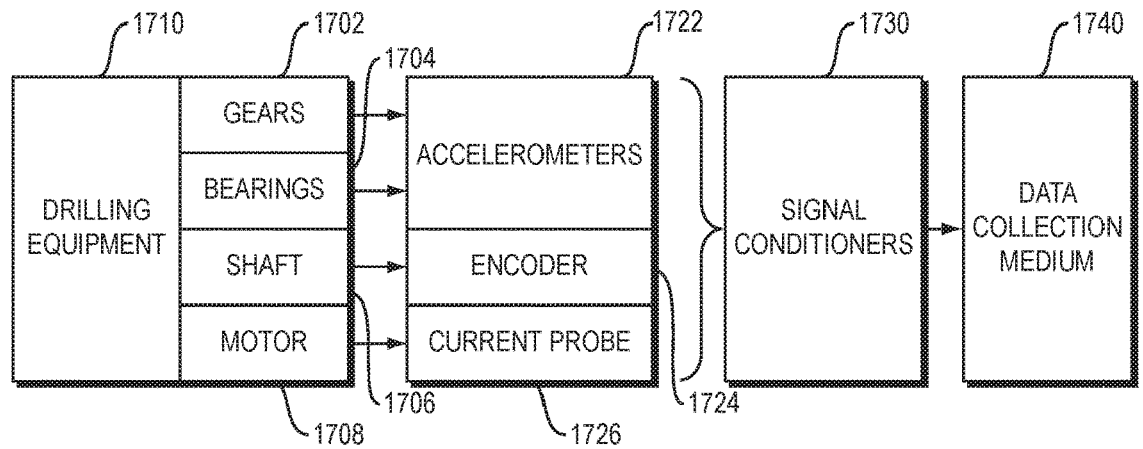
FIG. 17 is a block diagram of a data acquisition system.

FIG. 17 shows a block diagram of a multi-sensor data acquisition system according to an example embodiment of the present invention. Components of the drilling equipment 1710 that are usually monitored include gears 1702, bearings 1704, shaft 1706, and motor 1708. Multiple sensors, e.g., accelerometers 1722, encoder 1724, and electric current probe(s) 1726, are used to measure different parameters relevant to monitored components of the drilling equipment 1710. For example, accelerometers 1722 are usually used to measure acceleration, or vibration, of gears 1702 and bearings. The encoder 1726 is an electro-mechanical device that converts the angular position or motion of the shaft 1706 to an analog or digital code. Current probe(s) 1726 are employed in measuring the electric current of the induction motor 1708. Signal conditioners 1730 are devices used to convert one type of electronic signal into another type. In the context of this application, signal conditioners are used to convert measured signals or data associated with different parameters into an electronic format that is readable by the processing unit 140. The data collection medium 1740 includes one or more memory devices to temporarily store measured data and/or communication means for communicating the measured data to the processing unit 140. The communication means include, for example, a transmission interface, wireless transmitters, wiring, and/or any other devices or circuitry for data transmission. The multi-sensor data acquisition system is configured to provide sensors' data in real time. Alternatively, the sensors' data may be temporarily stored and provided to the processing unit 140 periodically over time periods.

Figure 18:
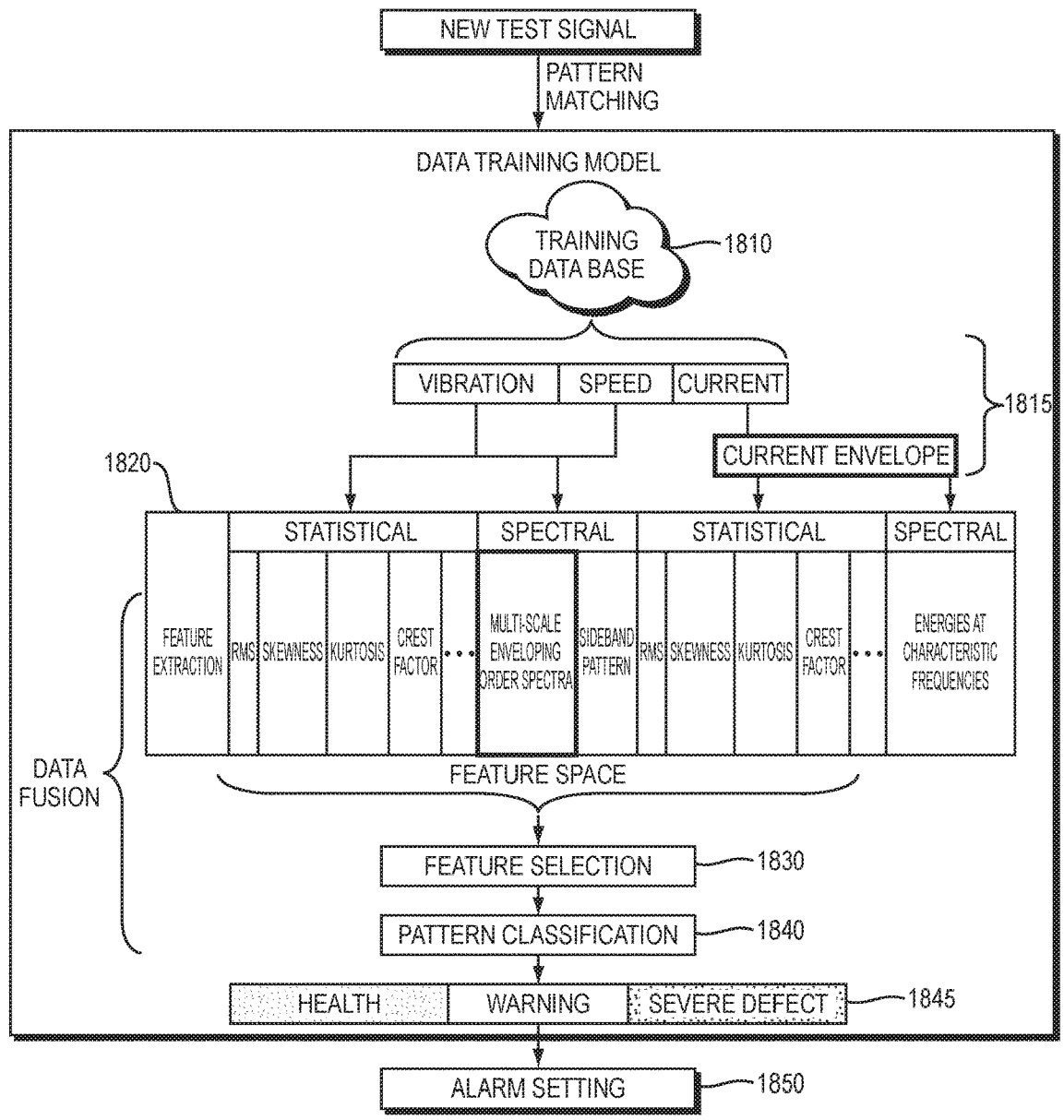
FIG. 18 illustrates a framework for defect diagnosis based on a multi-sensor data classification.

FIG. 18 illustrates an architecture of a logic rule model defect detection based on multi-sensor data fusion. Measurements 1815 of various types of signals or parameters' data associated with one or more components of a mechanical system, e.g., vibration/acceleration, motor current, speed, jerk, or the like, are received from the multi-sensor data acquisition system at 1810. A set of features or defect signatures are then calculated or extracted, at 1820, from measurements of each signal or parameter. Four statistical features, for example, from vibration signal(s) and current envelope are calculated, including the root mean square (RMS), Skewness, Kurtosis, and crest factors. The RMS is a measure for the magnitude of a varying quantity. It is also related to the energy of the signal. Skewness is used to characterize the degree of signal symmetry of the distribution around its mean, and Kurtosis indicates the spikiness of the signal. The crest factor is calculated from the peak value divided by the RMS value of the signal.

The frequency features of the vibration signal(s) are also used to construct the feature space, including the energies at the bearing characteristic frequencies $f_{BSF}$, $f_{BPFO}$, $f_{BPFI}$, and the gear side band around the gear meshing frequency. To extract them, vibration and speed signals are fed into the algorithms for multi-scale enveloping order spectra and sideband pattern analysis. Similarly, spectrum analysis of the motor current envelope is performed to extract the energies or powers at motor characteristic frequency, such as broken rotor bar ($f_{BRB}$=2 $ksf_s$) and eccentricity ($f_{ECE}$=k(1−s)$f_s$/p), where s is the motor slip, p is the pole number of motor, and k is the index number k=1, 2, 3, . . . .

A number of features may be extracted or calculated from the measurements to represent the original signals for defect classification. However, these features may contain redundant information. For improved computational efficiency in classification, a feature selection approach, such as minimum redundancy maximum relevancy (mRMR), is applied at 1830 to remove irrelevant and redundant features and lower the dimension of the feature space. According to one aspect, feature selection may be optional and all the extracted features are used in the classification process at 1840.

The mRMR method measures the relevance and redundancy of the feature candidates based on mutual information. Mutual information of two feature variables m and n is defined based on their joint probabilistic distribution p(m, n) and the respective marginal probabilities p(m) and p(n):

$$I(m, n) = \sum_{i,j} p(m_i, n_j)\log(p(m_i, n_j)/(p(m_i)p(n_j))) \quad (41)$$

The mRMR algorithm selects the dominant feature subset that has maximal relevance and minimal redundancy efficiently. After performing mRMR, the score, e.g., the difference between the relevance and redundancy, of each feature is obtained. A cumulated score percentage curve with the feature number may be used, and a criterion of 95% is set to select the dominant features. Irrelevant or redundant features are removed, and the most representative features are selected.

The selected features are then fused by a pattern classifier at 1840 based on, e.g., a support vector machine (SVM). Support vector machine is a pattern classification technique based on the statistical learning theory. SVM transforms the feature space into a higher dimensional space to determine the optimal hyper-plane by maximizing the separation distances among the classes. Given an input feature training set x∈χ, the transformed higher dimensional feature space is obtained as:

$$x'=\phi(x) \quad (42)$$

where $\phi$ is the transformation function. Assuming two classes y∈{1, −1} labeled as positive class $y_i$=1, and negative class $y_i$=−1, a hyper-plance f(x')=0 is then determined as:

$$f(x') = w^T X' + b = \sum_{j=1}^{n} w_j x'_j + b = 0 \quad (43)$$

where w is a n-dimensional vector and b is a scalar. The vector w and scalar b are used to define the position of separating hyper-plane.

The purpose of building the hyper-plane is to maximize the distance among the closest classes through the following optimization operation:

$$\max_{w \in R^n, b \in R} D, \text{ subject to } y_i(w^T x'_i + b) \geq D, \forall\, i \quad (4)$$

where D is the distance of the closest class to the hyper-plane, which may be set as 1/∥w∥ after normalization. Taking into account the noise with the slack variables $\xi_i$ and the error penalty C, Equation (3) is then rewritten as:

$$\min_{w, \xi \in R^n, b \in R} \left\{ \frac{1}{2}\|w\|^2 + C\sum_{i=1}^{N} \xi_i \right\} \quad (5)$$

$$\text{subject to } \xi_i \geq 0, \, y_i(w^T \phi(x_i) + b) \geq 1 - \xi_i, \, \forall\, i$$

Then the hyper-plane may be determined as a sign function (sgn(t)=1 for t≥0, and sgn(t)=−1 for t<0):

$$f(x) = \text{sgn}\left( \sum_{i=1}^{N} y_i \alpha_i \phi(x_i)^T \phi(x) + b \right) \quad (6)$$

Subsequently, the hyper-plane function may be determined by the kernel function $K(x_i, x) = \phi(x_i)^T \phi(x)$, by means of computing the inner products without specifying the explicit form of the transformation function $\phi$. Accordingly, the associated decision function is expressed as:

$$f(x) = \text{sgn}\left( \sum_{i=1}^{N} y_i \alpha_i K(x_i, x) + b \right) \quad (7)$$

At 1845, a condition of the drilling rig, or any other mechanical system, is determined. At 1850, the condition is reported for example by setting an alarm. The data fusion algorithm described above enhances the effectiveness of defect diagnosis, and establishes the basis for a logic rule model that determines the setting of various stages of alarms at 1850, e.g., in visual or audible forms, corresponding to various degradation levels of the drilling rig, e.g. healthy, warning, severe defect. Features extracted from different sensor data streams typically contain redundant information, because of the physical coupling of the various components in the drilling rig system.

Figure 19:
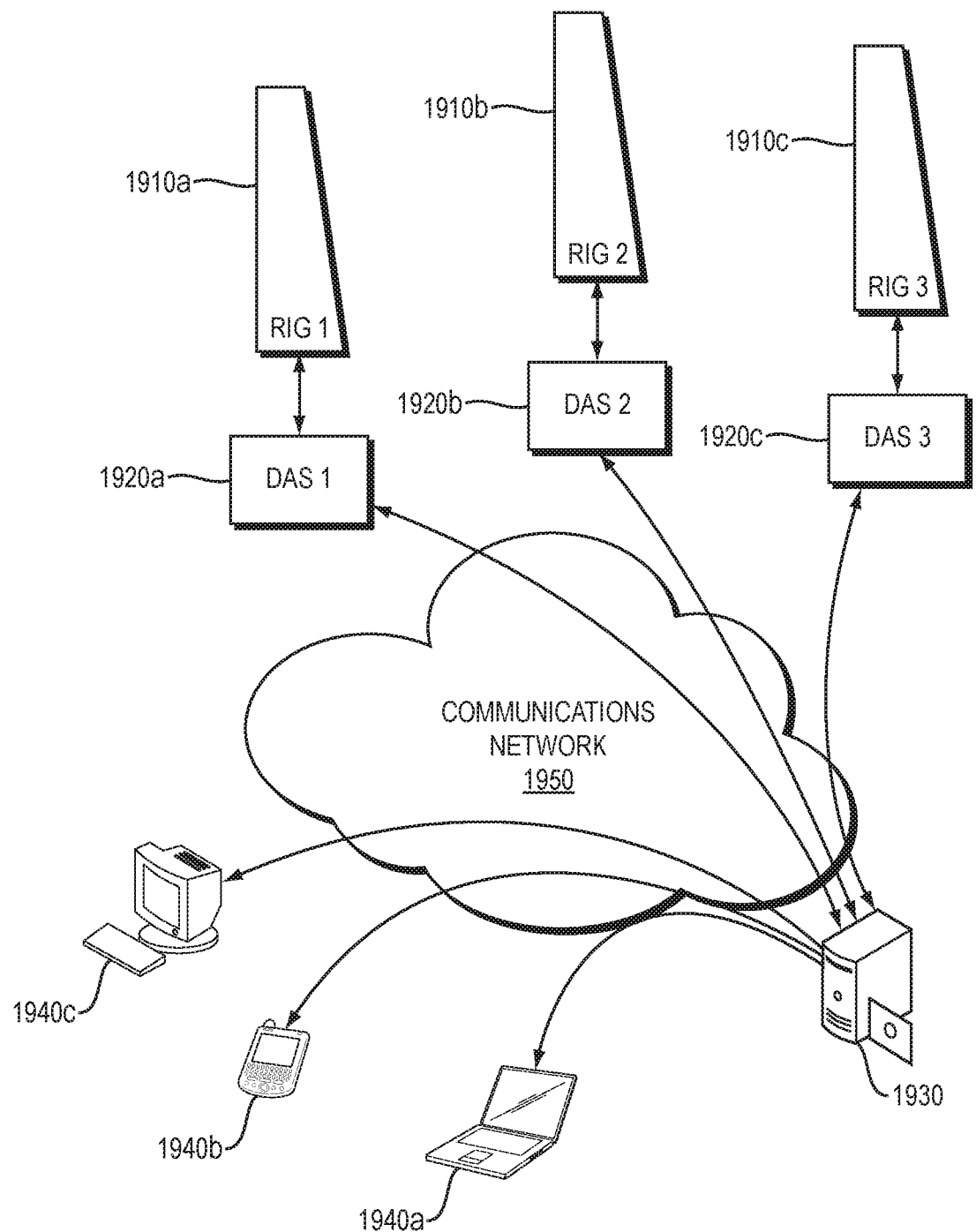
FIG. 19 is an overview of a system for implementing a centralized approach for monitoring drilling rigs or other mechanical systems.

FIG. 19 is an overview of a system for implementing a centralized approach for monitoring drilling rigs or other mechanical systems. One or more drilling rigs, e.g., 1910*a*, 1910*b* and 1910*c*, are associated with respective one or more data acquisition systems, e.g., 1920*a*, 1920*b*, and 1920*c*. The data acquisition systems collect sensor data and send it to a centralized processing unit 1930 through a communication network 1950. The communication network may be a local area network, a wireless wide area network, a wireless local area network, the Internet, a telephony network, or a combination thereof. The centralized processing unit 1930 may be a computer server or a cloud of servers. The processing unit 1930 processes the received sensor data and determines the condition of the one or more rigs, or other mechanical systems, and reports the determined conditions to one or more electronic devices, e.g., 1940*a*, 1940*b*, and 1940*c*, through the communication network 1950. The processing unit 1930 may also, or alternatively, report the determined conditions to the drilling sites corresponding to respective drilling rigs.

In reporting the determined condition of the drilling rigs, the processing unit 130 may send a Short Message Service (SMS) message, Multimedia Messaging Service (MMS) message, email, or any other type of communications message, including information about the conditions of the drilling rigs, to one or more entities. The processing unit 130 may, alternatively or in addition, post information about the conditions of the drilling rigs on an intranet or internet webpage or make the information available to other entities through an accessible database. According to another example, the processing unit 130 may be configured to remotely initiate an alarm. According to yet another example, the processing unit 130 may be configured to cause a drilling rig or another mechanical system, associated with a diagnosed defect, to halt operation in order to avoid any undesirable damage.

While FIG. 19 is described with respect to a plurality of drilling rigs, the same system and corresponding concept may be employed with respect to a single drilling rig. Similarly, the same system and corresponding concept may be employed in monitoring one or more mechanical systems associated with one or more sites, such as manufacturing or engineering sites.

Figure 20:
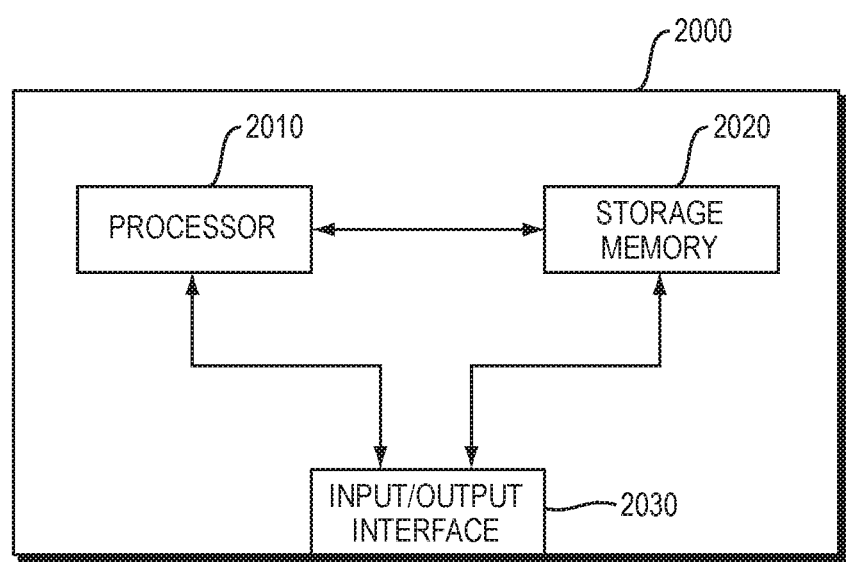
FIG. 20 is a block diagram of an apparatus in which defect diagnosis methods are implemented.

FIG. 20 is a block diagram of an example apparatus 2000 with means for performing defect diagnosis methods. The apparatus includes a storage memory 2020 configured to store data and computer code instructions. The computer code instructions, when executed by a processor 2010 cause the apparatus to perform any of the methods described above or in the following claims. The apparatus also includes Input/Output interface 2030 and a communications interface to receive and transmit data to other electronic devices. The device may also include a display unit to display content associated with the alarm for example.

A person skilled in the art should appreciate that measured data samples associated with a monitored component may be measured at the monitored component or another component, for example, coupled to the monitored component. For example, when measuring speed or acceleration, measuring may be performed at a monitored bearing (or gear) or otherwise at a shaft or other component coupled to the monitored bearing or gear. Also measurements associated with a motor, for example, may be used in the diagnosis of a bearing or gear and vice versa.

Embodiments described herein may be implemented in hardware, firmware, software, or any combination thereof. In certain embodiments, the procedures, devices, and processes described herein constitute a computer program product, including a computer readable medium (e.g., a removable storage medium such as one or more DVD-ROM's, CD-ROM's, diskettes, tapes, etc.) that provides at least a portion of the software instructions for the system. Such a computer program product may be installed by any suitable software installation procedure, as is well known in the art. In another embodiment, at least a portion of the software instructions may also be downloaded over a cable, communication and/or wireless connection.

Embodiments may also be implemented as instructions stored on a non-transitory machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method of detecting a defect in a drilling rig, the method comprising:
   measuring, during operation of the drilling rig, multi-sensor data from multiple sensors of different sensor types associated with at least one component of the drilling rig, the at least one component including a motor component, the multiple sensors including a current probe electrically coupled to the motor component, the measuring including measuring a motor current signal of the motor component via the current probe;
   calculating a plurality of features including frequency domain features using, at least in part, the multi-sensor data measured by the multiple sensors during operation of the drilling rig, the multi-sensor data representing different physical parameters of the at least one component, the frequency domain features including motor current envelope spectral features of a motor current envelope computed from the motor current signal, the motor current envelope being effective in producing the motor current envelope spectral features at defect-related frequencies with increased amplitude relative to motor current spectral features at the defect-related frequencies in a motor current spectrum of the motor current signal;
   classifying a subset of the calculated plurality of features, the subset including the motor current envelope spectral features, based on classification patterns constructed from multi-sensor training data corresponding to different operational conditions of the at least one component; and
   determining whether a defect exists in the at least one component based on the classified subset of features including the motor current envelope spectral features from the motor current envelope, with improved recognition accuracy of motor defects relative to using the motor current spectral features from the motor current spectrum, and reporting whether the defect exists in the at least one component of the drilling rig to a human-machine interface, enabling real-time condition monitoring and health diagnosis of the drilling rig.

2. The method of claim 1, wherein the calculated plurality of features include statistical features.

3. The method of claim 1, wherein the frequency domain features include multi-scale enveloping order spectra features.

4. The method of claim 1, wherein the calculated plurality of features include autoregressive coefficients.

5. The method of claim 1, wherein calculating a feature includes estimating the feature.

6. The method of claim 1 further comprising selecting a subset of the calculated plurality of features, the selected subset being classified.

7. The method of claim 6 wherein selecting a subset of the calculated plurality of features includes selecting a subset of the calculated plurality of features based on a minimum Redundancy Maximum Relevancy (mRMR) feature selection method.

8. The method of claim 6 wherein selecting a subset of the calculated plurality of features includes selecting a subset of the calculated plurality of features based on at least one of sequential backward selection method, principal component analysis method, and independent component analysis method.

9. The method of claim 1, wherein classifying the subset of features includes classifying the subset of features according to a support vector machine method.

10. The method of claim 1, wherein classifying the subset of features includes classifying the subset of features according to a k-nearest neighbor method.

11. The method of claim 1, wherein classifying the subset of features includes classifying the subset of features according to a Naive Bayes method.

12. The method of claim 1, wherein reporting whether the defect in the at least one component of the drilling rig exists includes initiating an alarm.

13. The method of claim 1, wherein the multi-sensor training data include measured data.

14. The method of claim 1, wherein the multi-sensor training data include computer simulated data.

15. A method of detecting a defect in a drilling rig, the method comprising:
measuring a first signal, during operation of the drilling rig, to produce a time sampled first representation of motion associated with a moving component of the drilling rig;
measuring a second signal, during operation of the drilling rig, to produce a time sampled second representation of motion associated with the moving component of the drilling rig;
calculating a set of wavelet envelopes of the time sampled first representation;
converting the set of wavelet envelopes from a time domain to a spatial domain based on measured samples of the time sampled second representation of motion associated with the moving component;
determining one or more spectral energy concentrations of the converted wavelet envelopes associated with at least one expected defect frequency of the moving component, the one or more spectral energy concentrations having increased amplitudes relative to amplitudes of spectral energy concentrations, produced using a conventional enveloping order spectrum method, at the at least one expected defect frequency; and
determining whether a defect in the moving component exists based on the determined one or more spectral energy concentrations with improved recognition accuracy of the defect relative to a determination based on the conventional enveloping order spectrum method and reporting whether the defect exists in the moving component of the drilling rig to a human-machine interface, enabling real-time condition monitoring and health diagnosis of the drilling rig.

16. The method of claim 15, wherein the first signal is an acceleration signal, the second signal is a speed signal, and the spatial domain is rotational angle domain.

17. The method of claim 15, wherein the second representation of motion is time-varying.

18. The method of claim 15, wherein the time sampled second representation of motion is sampled at a first set of sampling time instances with constant time period and wherein converting the set of wavelet envelopes includes:
calculating a second set of time instances corresponding to equal increments of spatial displacement; and
calculating another set of wavelet envelopes with samples corresponding to the second set of time instances.

19. The method of claim 15, wherein determining whether the defect in the moving component exists includes comparing the determined one or more spectral energy concentrations to one or more thresholds.

20. The method of claim 15, wherein determining whether the defect in the moving component exists includes comparing averages of the determined one or more spectral energy concentrations across different wavelet scales to one or more thresholds.

21. The method of claim 15, wherein determining whether the defect in the moving component exists includes comparing sums of the determined one or more spectral energy concentrations across different wavelet scales to one or more thresholds.

22. The method of claim 15, wherein reporting whether the defect in the moving component exists includes initiating an alarm.

23. A method of detecting a defect in a drilling rig, the method comprising:
producing electric current signal measurements by measuring an electric current signal of a motor of the drilling rig, the electric current signal measured during operation of the drilling rig by a current probe, the current probe electrically coupled to the motor;
calculating a motor current envelope from the electric current signal measurements;
calculating one or more motor current envelope spectral energy concentrations of the motor current envelope at one or more expected defect frequencies of the motor, the motor current envelope being effective in producing the one or more motor current envelope spectral energy concentrations at the one or more expected defect frequencies with increased amplitude relative to motor current spectral energy concentrations at the one or more expected defect frequencies in a motor current spectrum of the motor current signal; and
determining whether a defect in the motor exists based on the calculated one or more motor current envelope spectral energy concentrations, with improved recognition accuracy of motor defects relative to using the motor current spectral energy concentrations, and reporting whether the defect exists in the motor of the drilling rig to a human-machine interface, enabling real-time condition monitoring and health diagnosis of the drilling rig.

24. The method of claim 23, wherein determining whether the defect in the motor exists includes comparing the determined one or more spectral energy concentrations to one or more thresholds.

25. The method of claim 23, further including calculating other features of the envelope, other than the one or more spectral energy concentrations of the envelope at one or more expected defect frequencies of the motor, and wherein determining whether the defect in the motor exists includes classifying a subset of the calculated features, from the set of calculated features including the calculated one or more spectral energy concentrations and the other features, based on classifications patterns, the classification patterns being calculated using training data associated with the energy concentrations at expected defect frequencies of the motor and using training data associated with the other features.

26. The method of claim 25, further including selecting the subset of features based on a minimum redundancy maximum relevancy feature selection method.

27. The method of claim 23, wherein reporting whether the defect in the motor exists includes initiating an alarm.

28. The method of claim 23, wherein the motor is a drilling rig motor.

29. A method of detecting a defect in a drilling rig, the method comprising:

measuring a first signal, during operation of the drilling rig, to produce a time sampled first representation of motion associated with a moving component of the drilling rig;

measuring a second signal, during operation of the drilling rig, to produce a time sampled second representation of motion associated with the moving component of the drilling rig;

converting a set of measured samples of the time sampled first representation of motion associated with a moving component of the drilling rig from time domain to spatial domain based on measured samples of the time sampled second representation of motion associated with the moving component;

calculating a set of wavelet envelopes of the converted set of measured samples of the time sampled first representation of motion associated with the moving component during operation of the drilling rig;

determining one or more spectral energy concentrations of the calculated wavelet envelopes associated with at least one expected defect frequency of the moving component, the one or more spectral energy concentrations having increased amplitudes relative to amplitudes of spectral energy concentrations, produced using a conventional enveloping order spectrum method, at the at least one expected defect frequency; and determining whether a defect in the moving component exists based on the calculated one or more energy concentrations with improved recognition accuracy of the defect relative to a determination based on the conventional enveloping order spectrum method and reporting whether the defect exists in the moving component of the drilling rig to a human-machine interface, enabling real-time condition monitoring and health diagnosis of the drilling rig.

30. An apparatus for detecting a defect in drilling rig, the apparatus comprising:

means for measuring multi-sensor data during operation of the drilling rig, the at least one component including a motor component;

means for measuring a motor current signal of the motor component during operation of the drilling rig;

means for calculating a plurality of features including frequency domain features using, at least in part, the multi-sensor data, the multi-sensor data representing different physical parameters of the at least one component, the frequency domain features including motor current envelope spectral features of a motor current envelope computed from the motor current signal, the motor current envelope being effective in producing the motor current envelope spectral features at defect-related frequencies with increased amplitude relative to motor current spectral features at the defect-related frequencies in a motor current spectrum of the motor current signal;

means for classifying a subset of the calculated plurality of features, the subset including the motor current envelope spectral frequencies, based on classification patterns constructed from multi-sensor training data corresponding to different operational conditions of the at least one component; and means for determining whether a defect exists in the at least one component based on the classified subset of features including the motor current envelope spectral frequencies from the motor current envelope, with improved recognition accuracy of motor defects relative to using the motor current spectral features from the motor current spectrum, and reporting whether the defect exists in the at least one component of the drilling rig to a human-machine interface, enabling real-time condition monitoring and health diagnosis of the drilling rig.

31. An apparatus comprising a memory with computer code instructions stored thereon and a processor, the memory and computer code instructions, with the processor, being configured to cause the apparatus to:

measure, during operation of a drilling rig, multi-sensor data from multiple sensors of different sensor types associated with at least one component of the drilling rig, the at least one component including a motor component, the multiple sensors including a current probe electrically coupled to the motor component;

measure a motor current signal of the motor component via the current probe during operation of the drilling rig;

calculate a plurality of features including frequency domain features using, at least in part, the multi-sensor data, the multi-sensor data representing different physical parameters of the at least one component, the frequency domain features including motor current envelope spectral features of a motor current envelope computed from the motor current signal, the motor current envelope being effective in producing the motor current envelope spectral features at defect-related frequencies with increased amplitude relative to motor current spectral features at the defect-related frequencies in a motor current spectrum of the motor current signal;

classify a subset of the calculated plurality of features, the subset including the motor current envelope spectral features, based on classification patterns constructed from multi-sensor training data corresponding to different operational conditions of the at least one component; and determine whether a defect exists in the at least one component based on the classified subset of features including the motor current envelope spectral features from the motor current envelope, with improved recognition accuracy of motor defects relative to using the motor current spectral features from the motor current spectrum, and reporting whether the defect exists in the at least one component of the drilling rig to a human-machine interface, enabling real-time condition monitoring and health diagnosis of the drilling rig.

32. A computer-readable medium comprising computer code instructions stored thereon, the computer code instructions when executed by a processor cause an apparatus to:

measure, during operation of a drilling rig, multi-sensor data from multiple sensors of different sensor types associated with at least one component of the drilling rig;

calculate a plurality of features including frequency domain features using, at least in part, the multi-sensor, the at least one component including a motor component, the multi-sensor data representing different physical parameters of the at least one component, the multiple sensors including a current probe, the current probe electrically coupled to the motor component of the drilling rig and configured to measure a motor current signal of the motor component during operation of the drilling rig, the frequency domain features including motor current envelope spectral features of a motor current envelope computed from the motor current signal, the motor current envelope being effective in producing the motor current envelope spectral features at defect-related frequencies with increased amplitude relative to motor current spectral features at the defect-related frequencies in a motor current spectrum of the motor current signal;

classify a subset of the calculated plurality of features, the subset including the motor current envelope spectral features, based on classification patterns constructed from multi-sensor training data corresponding to different operational conditions of the at least one component; and determine whether a defect exists in the at least one component based on the classified subset of features including the motor current envelope spectral features from the motor current envelope, with improved recognition accuracy of motor defects relative to using the motor current spectral features from the motor current spectrum, and reporting whether the defect exists in the at least one component of the drilling rig to a human-machine interface, enabling real-time condition monitoring and health diagnosis of the drilling rig.

* * * * *